United States Patent [19]
Bietry

[11] Patent Number: 5,886,825
[45] Date of Patent: Mar. 23, 1999

[54] MAGNIFIER LENS

[75] Inventor: Joseph R. Bietry, Rochester, N.Y.

[73] Assignee: Eastman Kodak Company, Rochester, N.Y.

[21] Appl. No.: 964,488

[22] Filed: Nov. 5, 1997

[51] Int. Cl.[6] .............................. G02B 25/00; G02B 3/02; G02B 9/12; G02B 5/18

[52] U.S. Cl. ..................... 359/645; 359/643; 359/716; 359/784; 359/574

[58] Field of Search .................................. 359/645, 644, 359/643, 716, 784, 574, 646

[56] References Cited

U.S. PATENT DOCUMENTS

| | | | |
|---|---|---|---|
| 3,158,677 | 11/1964 | Lacomme et al. | 359/646 |
| 5,162,945 | 11/1992 | Matsuo et al. | 359/716 |
| 5,202,795 | 4/1993 | Kashima | 359/645 |
| 5,440,197 | 8/1995 | Gleckman | 313/110 |
| 5,446,588 | 8/1995 | Missig et al. | 359/645 |
| 5,619,379 | 4/1997 | Fukumoto | 359/645 |
| 5,703,721 | 12/1997 | Bietry et al. | 359/646 |

OTHER PUBLICATIONS

Cyberdisplay ™, 320 Monochrome Display Specifications, Kopin Corp. pp. 3–19 through 3–20. ©1997.

Military Standardization Handbook, Optical Design, Handbook number 141, Oct. 5, 1962 pp. 14–4 through 14–19.

*Primary Examiner*—Georgia Epps
*Assistant Examiner*—Evelyn A. Lester
*Attorney, Agent, or Firm*—Svetlana Z. Short

[57] ABSTRACT

A magnifier lens comprises three lens elements. More specifically, from a front, eye side to a rear, object side there are a front positive lens element, a middle, negative power lens element and a rear, meniscus lens element. The front, positive power lens element has at least one aspheric surface. The front and the middle lens elements, in combination, contain at least one diffractive surface. The rear, meniscus lens element has front and rear refractive surfaces, both of which are concave toward the object side. The rear surface is positioned within 5 mm of an object to be viewed from the eye side. This rear surface is an aspheric surface of negative power that corrects field curvature.

6 Claims, 30 Drawing Sheets

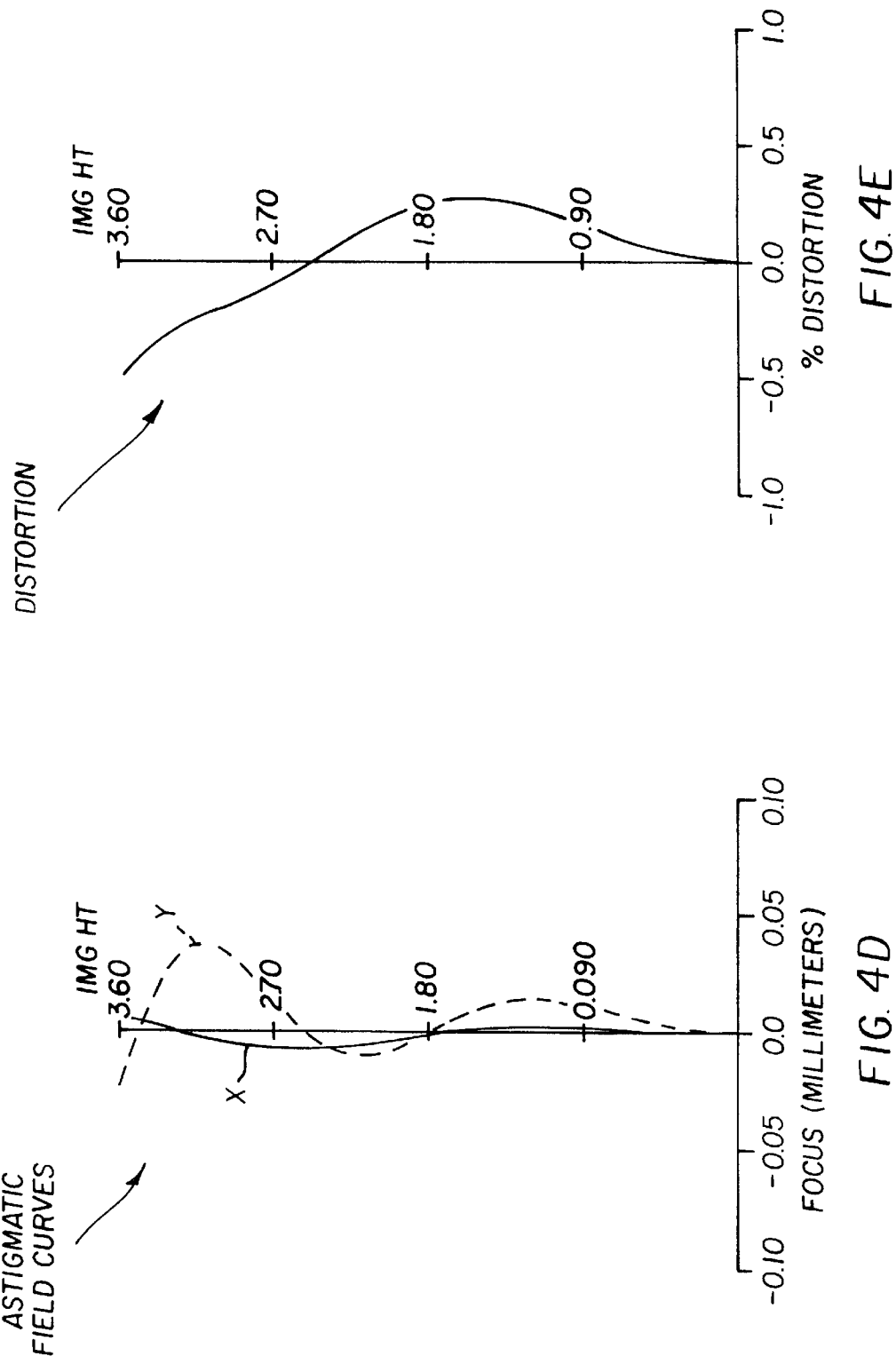

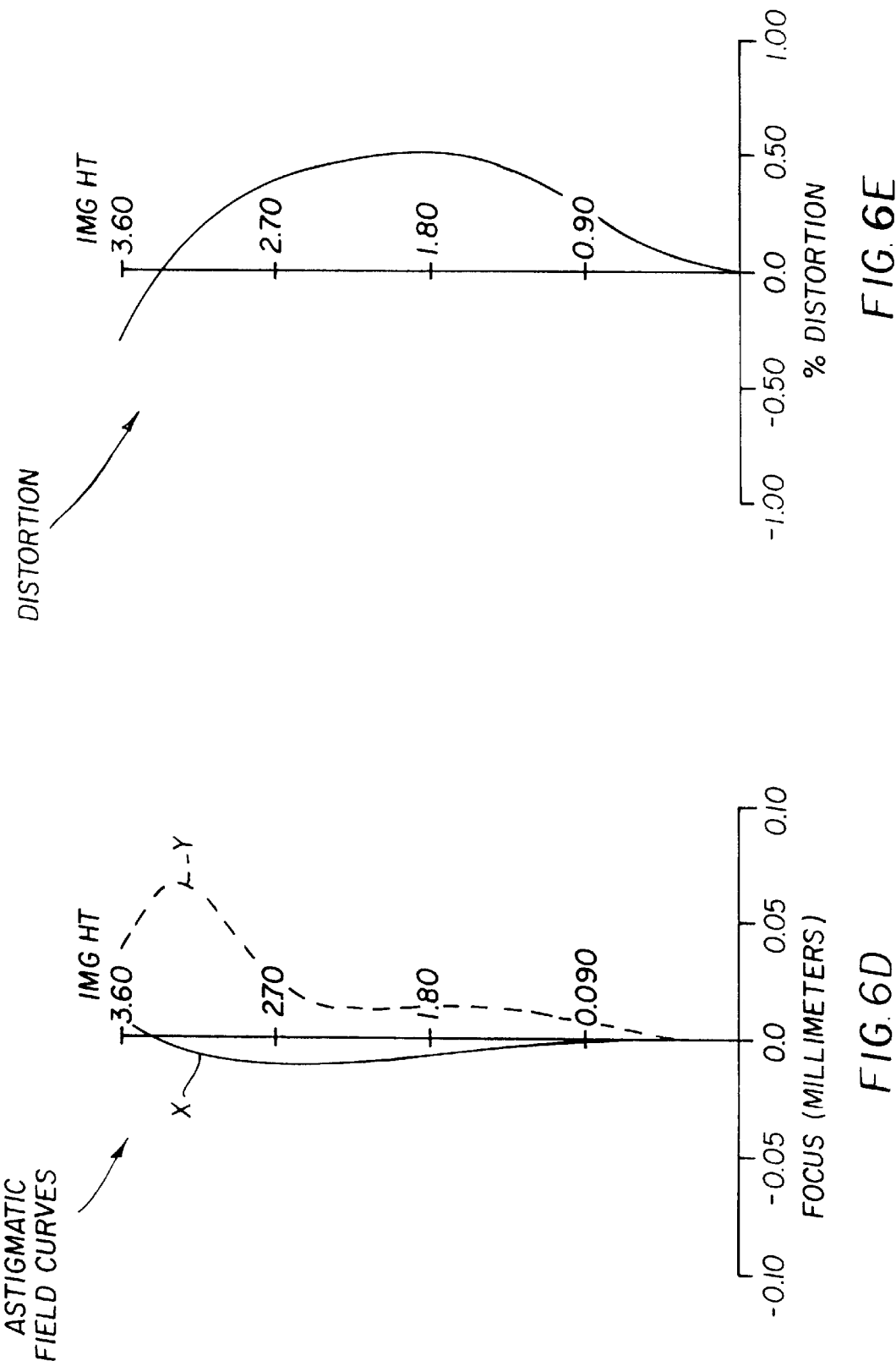

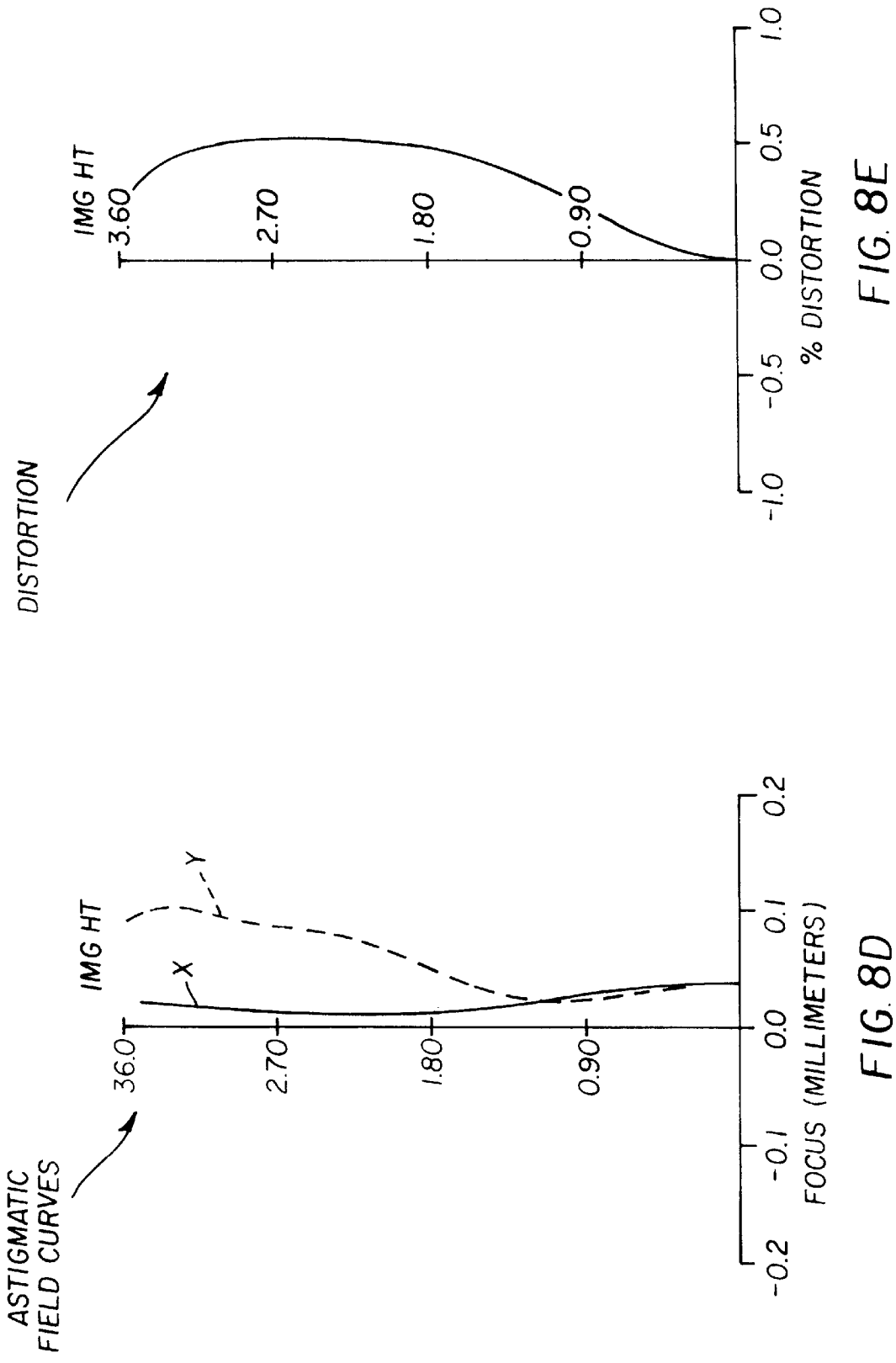

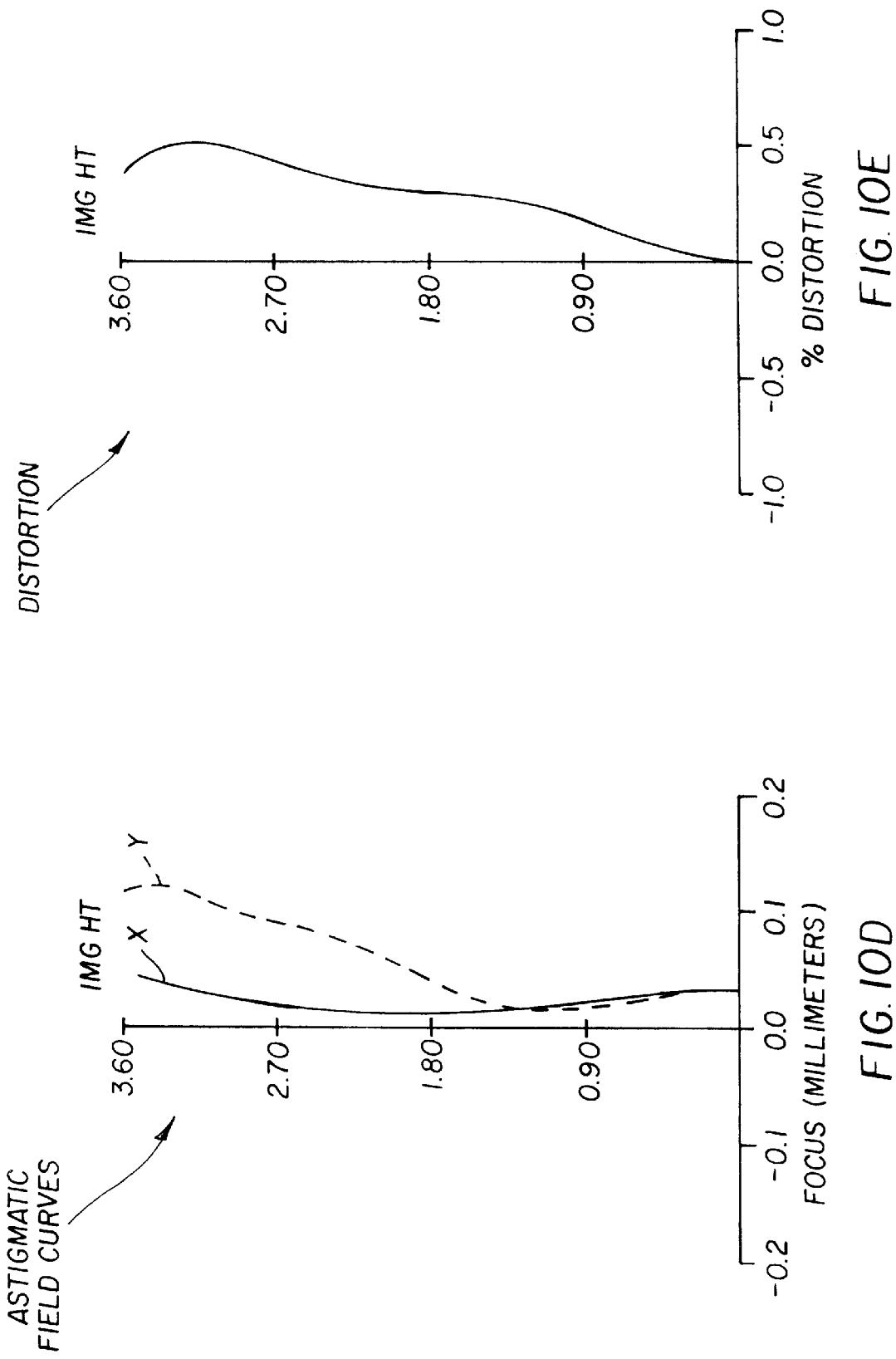

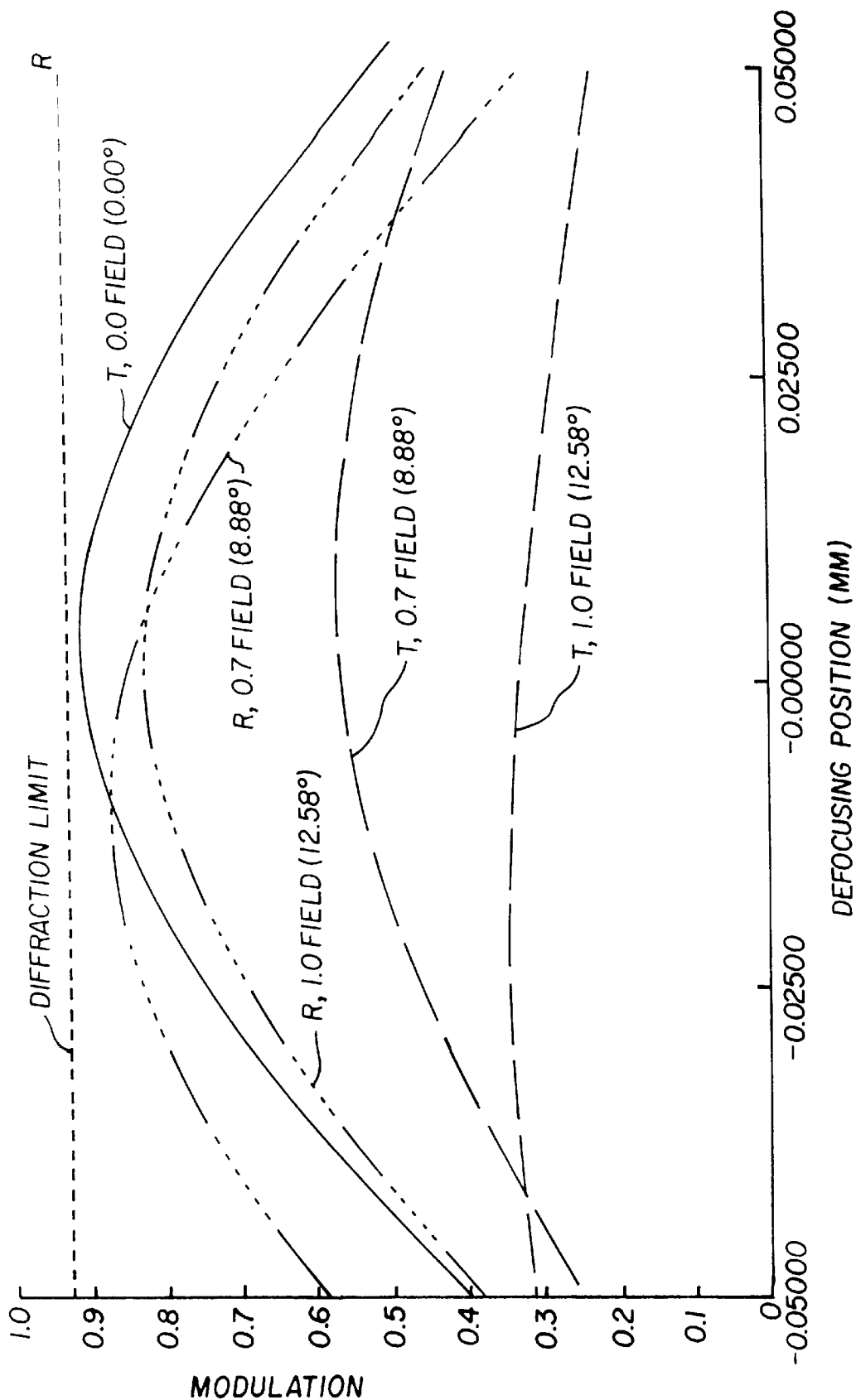
FIG. 10.G

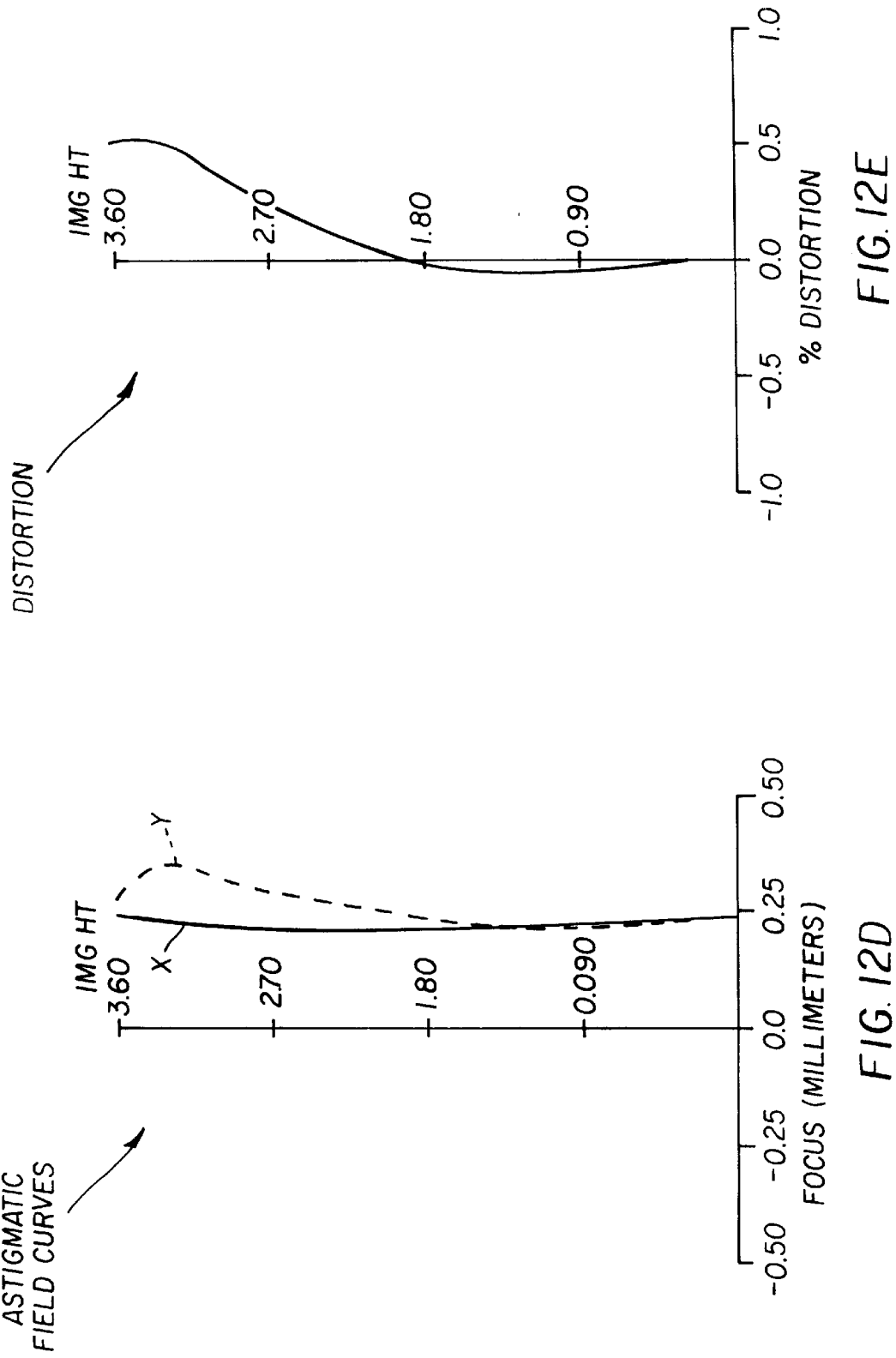

MAGNIFIER LENS

CROSS REFERENCE TO RELATED APPLICATION

This application is related to commonly assigned, copending U.S. applications, Ser. No. 08/964,484, entitled AN IMPROVED MAGNIFIER LENS, in the name of Joseph R. Bietry, filed concurrently herewith, and Ser. No. 08/562,666, entitled, OPTICAL MAGNIFIER in names of Joseph R. Bietry, Lee Estelle and Paul Luddington, filed on Nov. 27, 1995, now U.S. Pat. No. 5,703,721.

FIELD OF THE INVENTION

This invention relates to high power magnifier lenses and more specifically to magnifier lenses suitable for use in display systems such as liquid crystal (LCD), or light emitting diode (LED) display systems.

DESCRIPTION OF THE PRIOR ART

Conventional display systems utilize magnifier lenses that provide an enlarged virtual image of a real object in front of a viewer's eye. Such magnifier lenses need to provide a relatively long eye relief (distance at which the lens can be held from the eye) which allows a display to be comfortably viewed.

It is known in lens systems that focal length is inversely related to magnification and field of view. However, having a large field of view makes it difficult to correct off axis aberrations such as coma, astigmatism, lateral color, and defocus due to field curvature. These aberrations greatly reduce the image quality of the displayed image.

A magnifier lens for a display system is produced by the Kopin Corporation of Taunton, Mass. This magnifier lens is described in the Specification manual titled "Cyber Display™ 320 Monochrome Display Specifications", pages 3–19 through 3–20. This magnifier lens has two lens elements, one with a diffractive surface, and provides a half field of view of only +/−8 degrees and a focal length of 21.4 mm. This magnifier lens (with an image viewed at infinity) provides a magnification of M=11.9x. This magnification is calculated with the standard formula: M=254 mm/(focal length, measured in mm). This magnifier lens is not suitable for applications requiring magnification equal to or greater than 15x.

Some of the standard eyepiece lenses are suitable for use as magnifier lenses in display systems. These eyepiece lenses provide greater magnifications and larger fields of view than the above described magnifier lens, but suffer from off axis aberrations, particularly lateral color and field curvature. Such aberrations reduce the image quality at the edge of the displayed image. These eyepiece lenses are described on pages 14–4 through 14–19 of the "Military Standardization Handbook, Optical Design", Handbook number 141, published Oct. 5, 1962. More specifically, when these eyepiece lenses are scaled to a focal length of 16 mm, the lateral color aberration (of all but one of these lenses) at a field of view of +/−12 degrees is greater than 16 microns. This results in color fringing, decreased resolution and degraded image quality. The one eyepiece that does not have much lateral color is described on pages 14–8 through 14–9. This eyepiece suffers from field curvature and astigmatism making the corners of the displayed image to be out of focus. Further, the lateral color correction of this eyepiece is achieved by use of a cemented triplet component. Such cemented triplet components are difficult to manufacture and are expensive.

Some of the applications for magnifier lenses require magnifier lenses that are (i) color corrected over an entire visible spectrum (480 nm–630 nm), and (ii) provide extremely high resolution across a wide field. These applications also require relatively low cost and therefore, require relatively few lens elements. The above discussed magnifier lenses do not satisfy these requirements.

SUMMARY OF THE INVENTION

An object of the present invention is to provide an improved magnifier lens suitable for use in a display system having (i) a field of view of at least +/−10 degrees, (ii) a small number of lens elements, (iii) color correction over an entire visible spectrum. It is also an object of the present invention to provide a magnifier lens for a display system that has an image quality better than that of the prior art magnifier lenses.

According to the present invention, the magnifier lens comprises three lens elements. More specifically, from a front, eye side to a rear, object side there is a front, positive power lens element, a middle, negative power lens element and a rear, meniscus lens element. The front, positive power lens element has at least one aspheric surface. The middle, negative power lens element accepts light from the front, positive power lens element. The front, positive power lens element and the middle, negative power lens element, in combination, contain at least one diffractive surface. The rear, meniscus lens element accepts light from the middle, negative power lens. The rear, meniscus lens element has front and rear refractive surfaces, both of which are concave toward the object side. The rear surface is positioned within 5 mm of an object to be viewed from the eye side. This rear surface is an aspheric surface of negative power that corrects field curvature.

It is an advantage of the magnifier lens of the present invention that it has relatively few lens elements, has a half field in excess of +/−10 degrees and provides a magnification of 16 x, while maintaining superior image quality.

BRIEF DESCRIPTION OF THE DRAWINGS

The foregoing and other objects, features and advantages of the invention as well as presently preferred embodiments thereof will become more apparent from reading the following description in connection with the accompanying drawings:

FIGS. 4A–4F are graphical representations of the aberrations of the magnifier lens illustrated in FIG. 3.

FIGS. 6A–6F are graphical representations of the aberrations of the magnifier lens illustrated in FIG. 5.

FIGS. 8A–8F are graphical representations of the aberrations of the magnifier lens illustrated in FIG. 7.

FIGS. 10A–10F are graphical representations of the aberrations of the magnifier lens illustrated in FIG. 9.

FIG. 10G is a plot of the through focus Modulation Transfer Function (MTF) of the magnifier lens illustrated in FIG. 9.

FIGS. 12A–12F are graphical representations of the aberrations of the magnifier lens illustrated in FIG. 11.

DESCRIPTION OF THE PREFERRED EMBODIMENT

In the following descriptions, the term "magnifier lens" will be used to describe an optical system disclosed and claimed. However, a person skilled in the art will understand it can be used as an eyepiece with other optical components and should not be considered limited to any particular application. Note, that since the light can be directed through the lens in any direction, the eye position can be replaced by a galvanometer or a rotating polygon with some minor distortion adjustments. Thus, a "magnifier lens" constructed according to the invention could be used for scanner applications. It can also be used as a viewfinder lens in digital cameras to image a scene displayed on an electronic (preview) image display to the user's eye. The terms "front" and "rear" refer to the eye and object side of the magnifier lens, respectively. In the following examples, 10 is the diaphragm of the eye or another instrument and 20 is a cover plate protecting the image display 30. Such cover plate can be easily removed with only a minor modification to the magnifier lenses described below.

The embodiments of the invention illustrated by six examples are shown respectively in FIGS. 1, 3, 5, 7, 9, and 11, and are set fourth in Tables 1 through 6. In the tables and the drawings, the surfaces R are numbered by subscripts from the front side of the lens to the rear side of the lens. The thickness T of the lens elements and the spacings S between elements are also numbered from front to rear. For example, $S_1$ corresponds to the first air space and $S_2$ to the second air airspace. In the tables, spaces and thicknesses are listed on the same line as the surface preceding the space or thickness, as the case may be. All indices $N_d$ are for the helium d line of the spectrum at a wavelength $\lambda_d$ of 587.6 nm. The symbol $V_d$ stands for the Abbe number (also known as a V-number) of the lens material. The thickness and the spacings provided in the tables are in millimeters. All of the embodiments have a focal length of 16 mm and accept a field angle of about +/−13 degrees.

Figure 1:
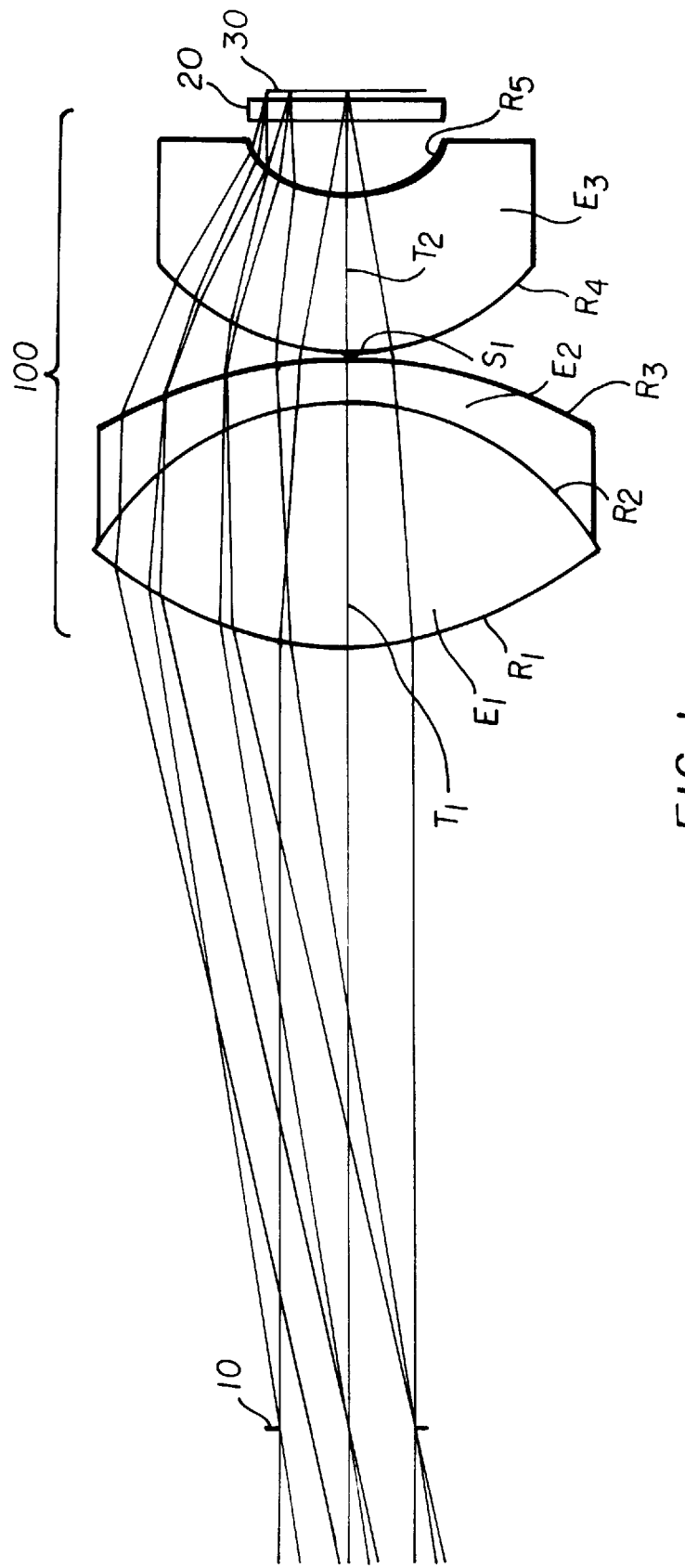
FIG. 1 shows a sectional view of the magnifier lens of a first illustrative embodiment.

A magnifier lens 100 of a first embodiment of the present invention is depicted in FIG. 1. This magnifier lens includes three lens elements $E_1$, $E_2$, $E_3$ The front lens element $E_1$ is a biconvex lens element. Its front, eye side surface is aspheric. This aspheric surface controls third and higher order monochromatic aberrations. The middle lens element $E_2$ is a negative power meniscus lens element. It controls lateral and axial color aberrations. The convex surface of this lens element is a diffractive surface with aspherical components. This diffractive surface minimizes secondary lateral color, provides field correction and helps balance axial color aberration. The concave surface of the middle lens element $E_2$ faces the front lens element $E_1$ and is cemented to it, forming a cemented lens component. This cemented lens component is an achromatized positive power doublet. The diffractive surface of the a negative power meniscus lens element $E_2$ contributes positive power to the cemented doublet, allowing the front lens element to become less powerful. This, in turn allows the front lens element to have weaker radii of curvature than it would have otherwise, making it easier to manufacture. Both lens elements $E_1$, $E_2$ forming the cemented lens components are plastic and can be easily molded. The rear lens element $E_3$ is a meniscus lens element, concave towards the rear side— i.e., the display or object side. This lens element $E_3$ is made of plastic and can be easily molded. Its index of refraction is 1.492. The concave surface of this meniscus lens element $E_3$ is aspheric. This aspheric surface is positioned within 5 mm of an object to be viewed, such as the image display 30. The benefits of this aspheric surface are described in the cross-referenced patent application Ser. No. 08/562,666.

The focal length $FL_1$ of the cemented lens component of the first illustrative embodiment is about 18.9 mm and its power is about 0.053. The focal length $f_3$ of the rear lens element $E_3$ of the first illustrative embodiment is about −69.76 millimeters and its power is about −0.0143. The ratio of two focal length $FL_1/f_3$ is −0.271. Thus, the majority of optical power in the magnifier lens 100 of the first embodiment of the present invention comes from the cemented lens component.

Figure 3:
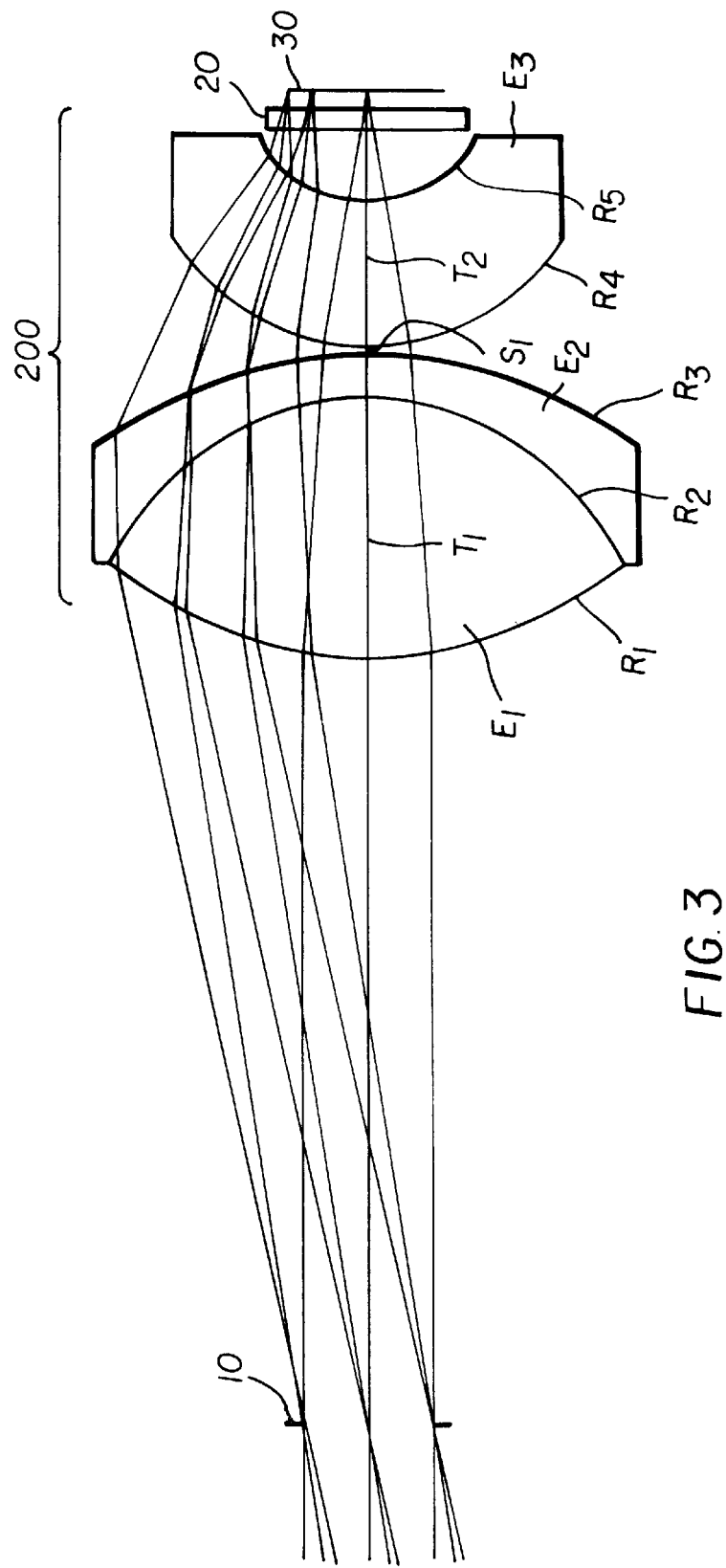
FIG. 3 is a sectional view of the magnifier lens system of a second illustrative embodiment.
Figure 4A:
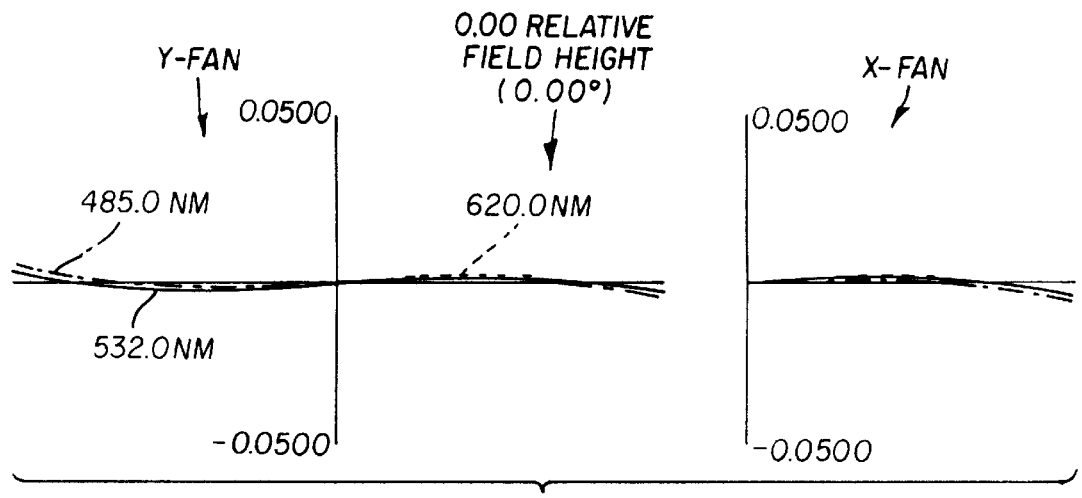
Figure 4B:
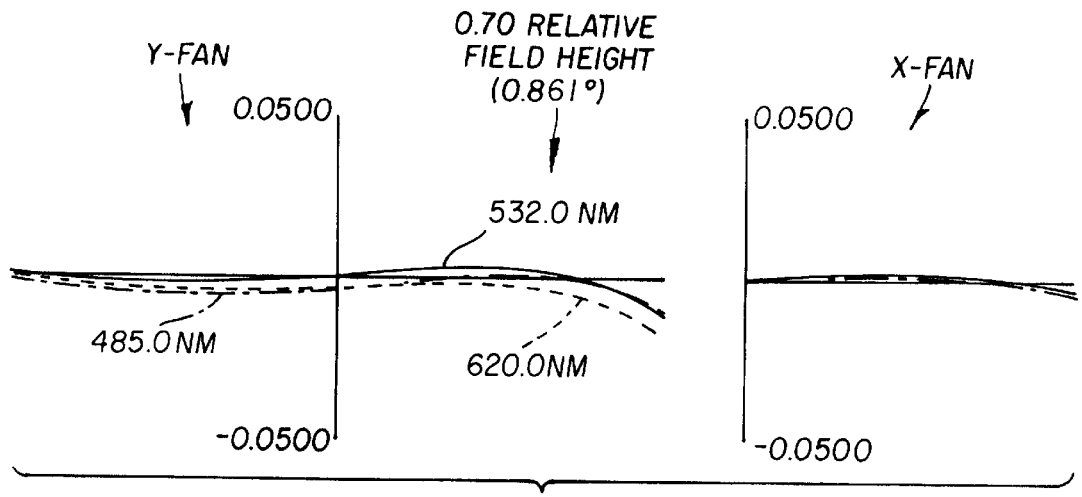
Figure 4C:
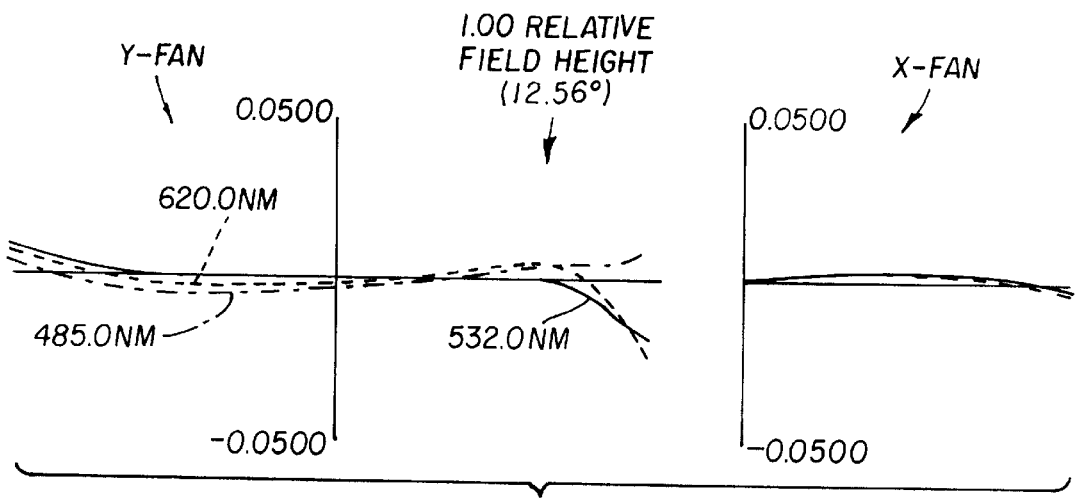
Figure 4F:
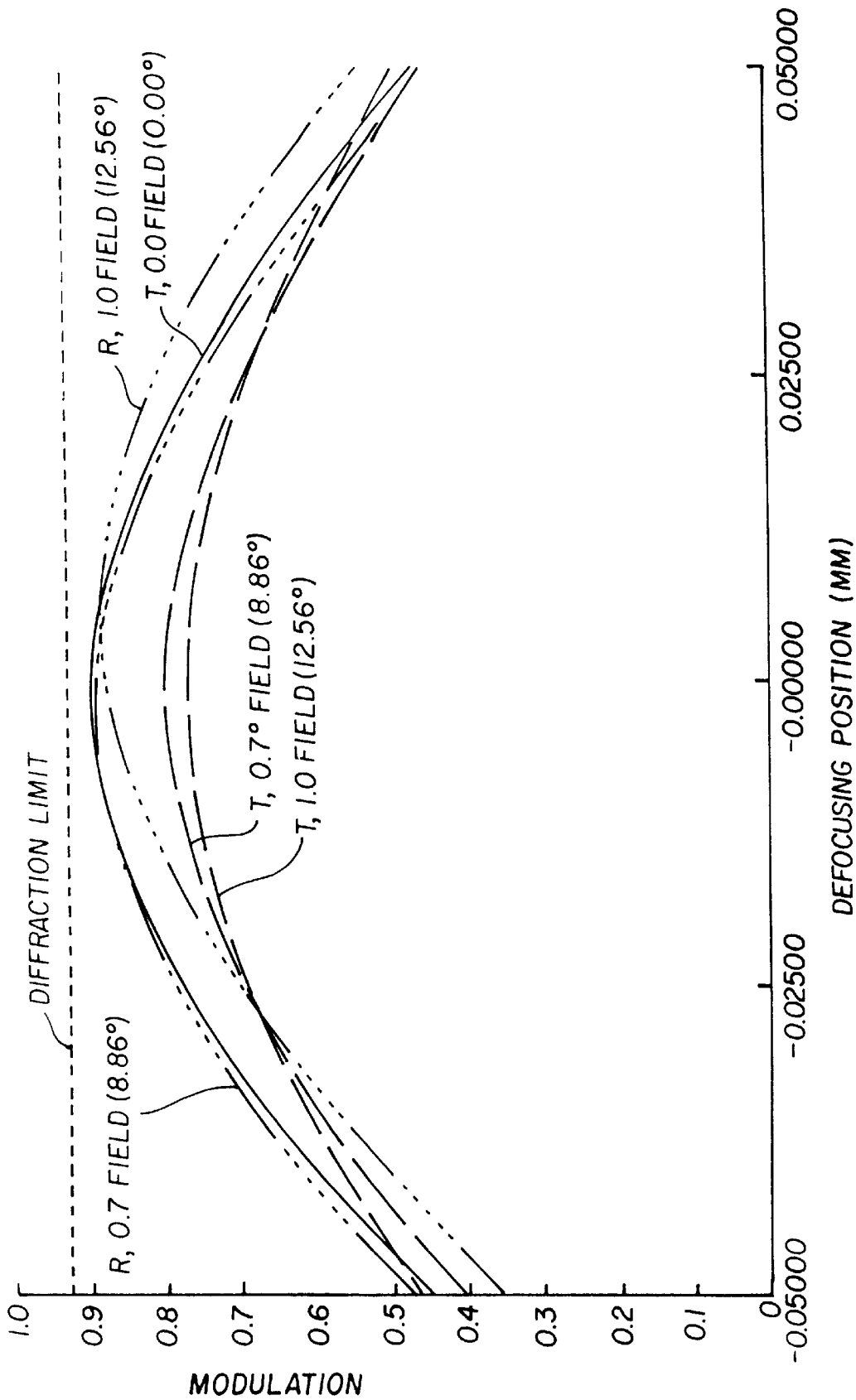
Figure 4G:
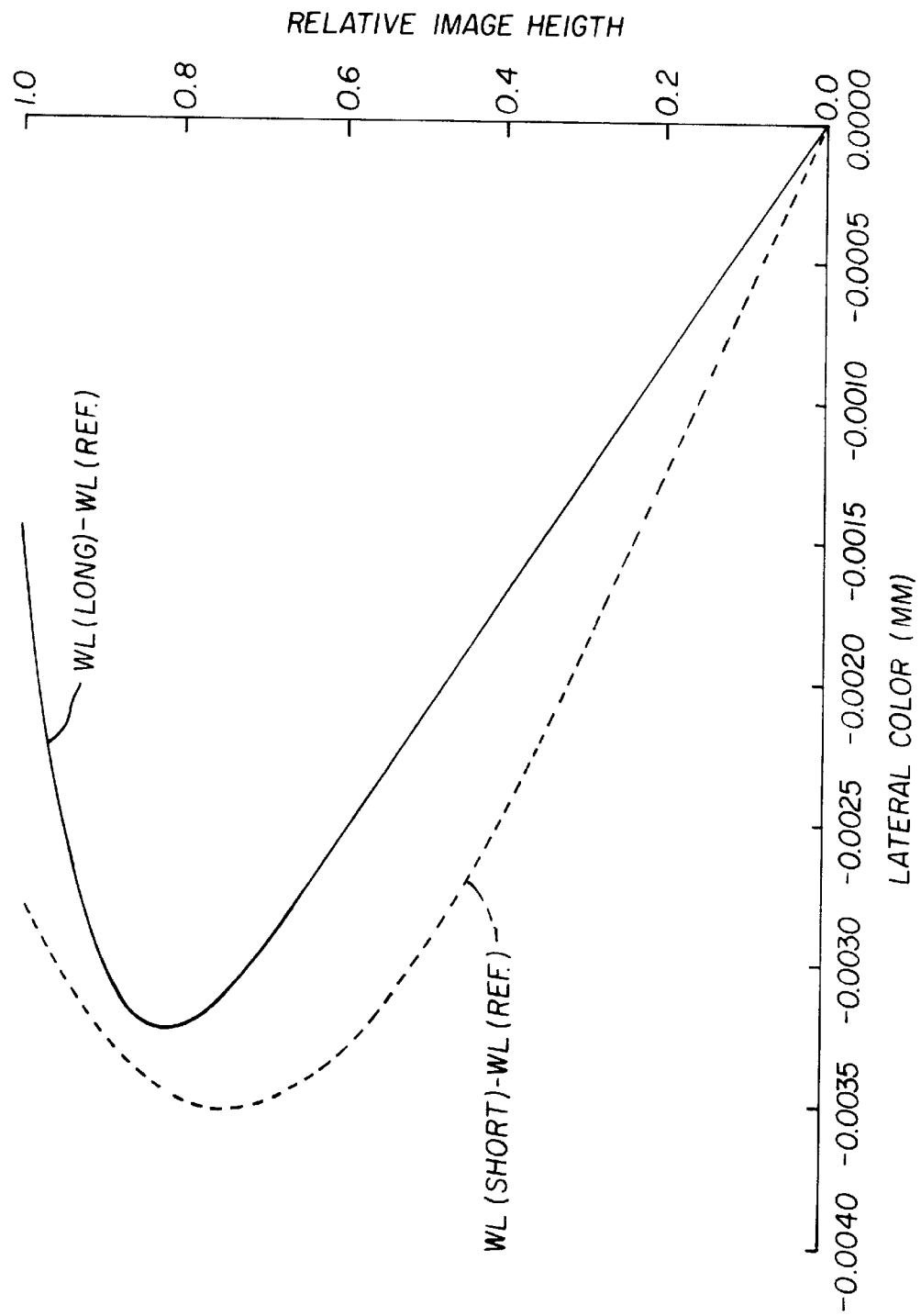
FIG. 4G is a plot of the through focus Modulation Transfer Function (MTF) of the magnifier lens illustrated in FIG. 3.

A magnifier lens 200 of the second embodiment is depicted in FIG. 3. The magnifier lens 200 is similar to that of the first embodiment, but it utilizes a higher index material ($N_d$=1.734) for its rear lens element $E_3$. This improves aberration control, especially astigmatism. The focal length $FL_1$ of the cemented lens component of the second illustrative embodiment is about 19.8 mm. The focal length $f_3$ of the rear lens element $E_3$ of the second illustrative embodiment is about −66.6 mm. The ratio of two focal length $FL_1/f_3$ is −0.297.

Figure 5:
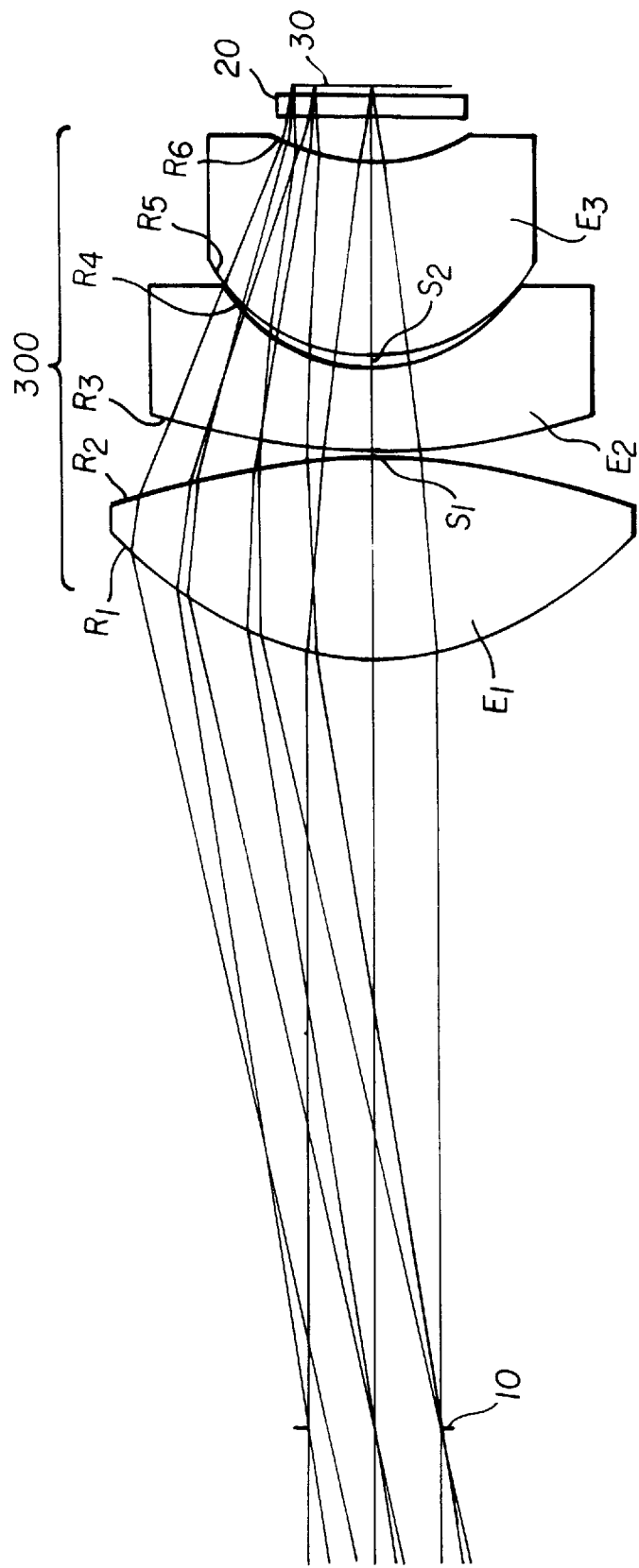
FIG. 5 shows a sectional view of the magnifier lens of a third illustrative embodiment.
Figure 6A:
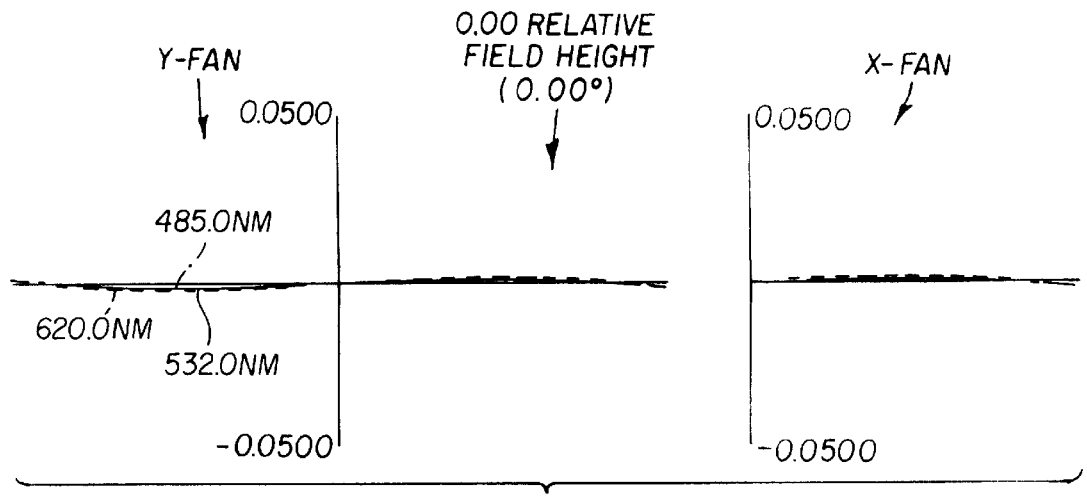
Figure 6B:
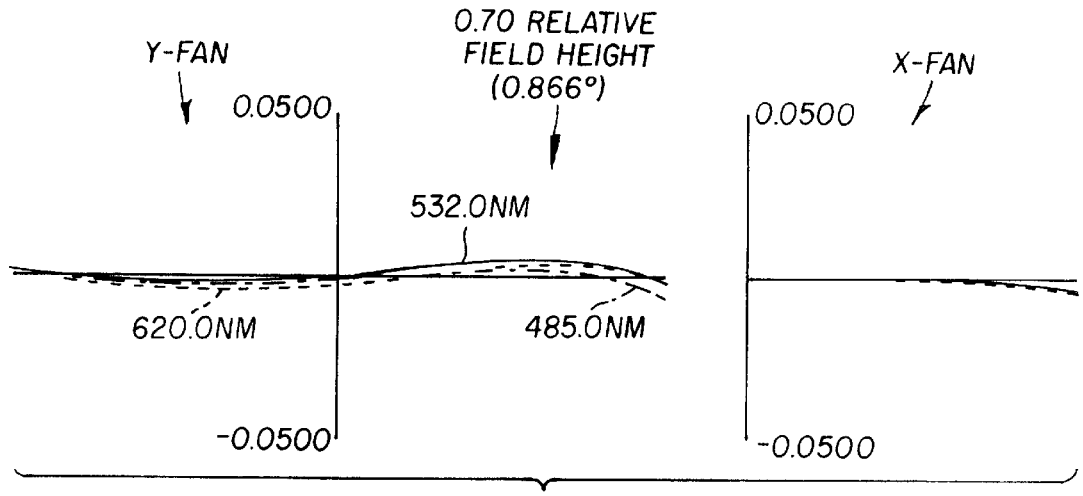
Figure 6C:
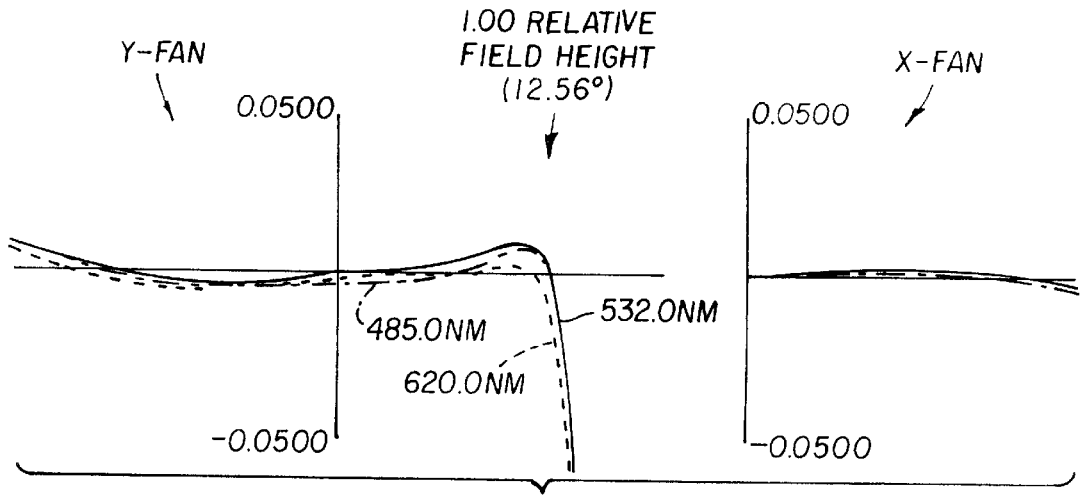
Figure 6F:
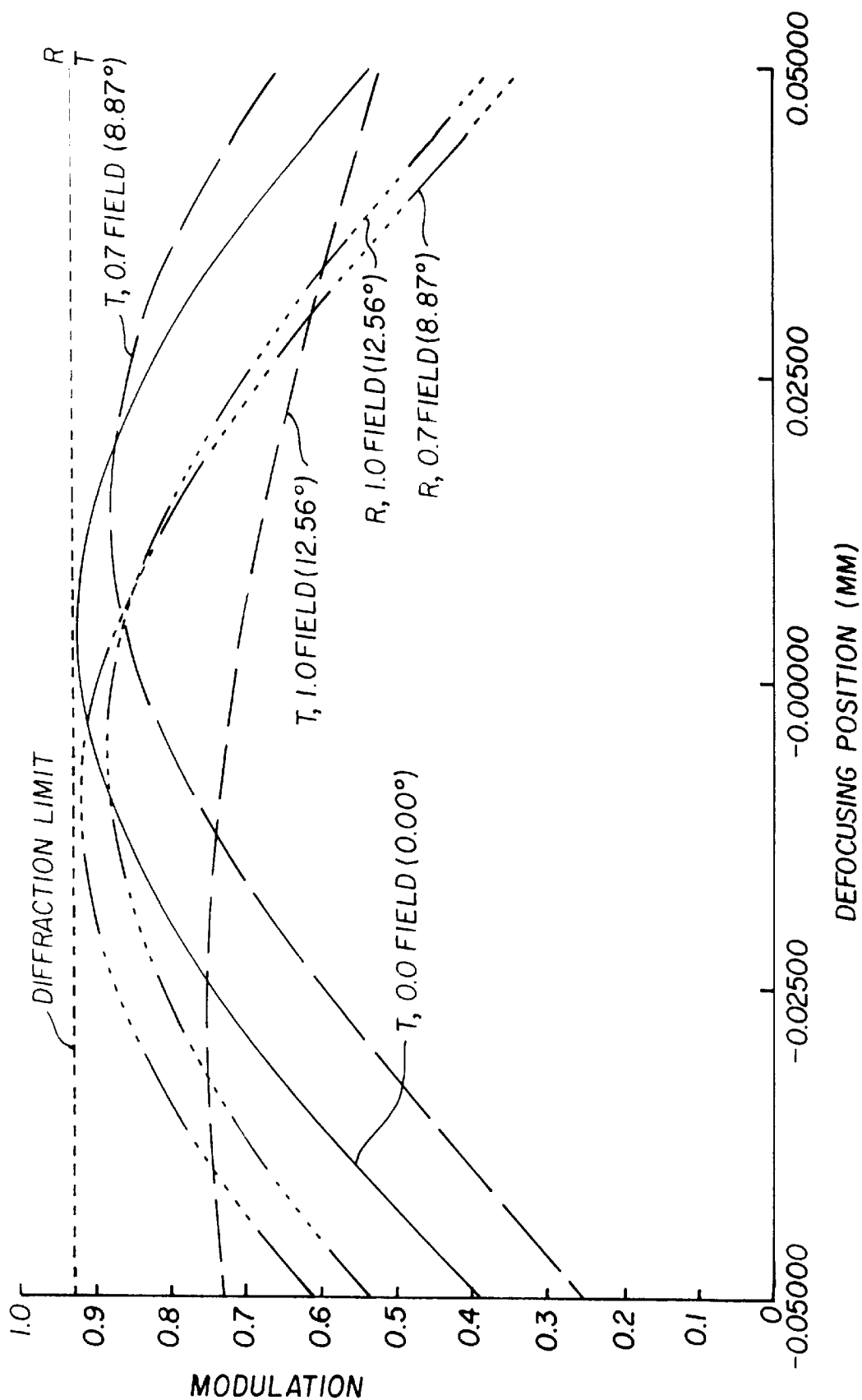
Figure 6G:
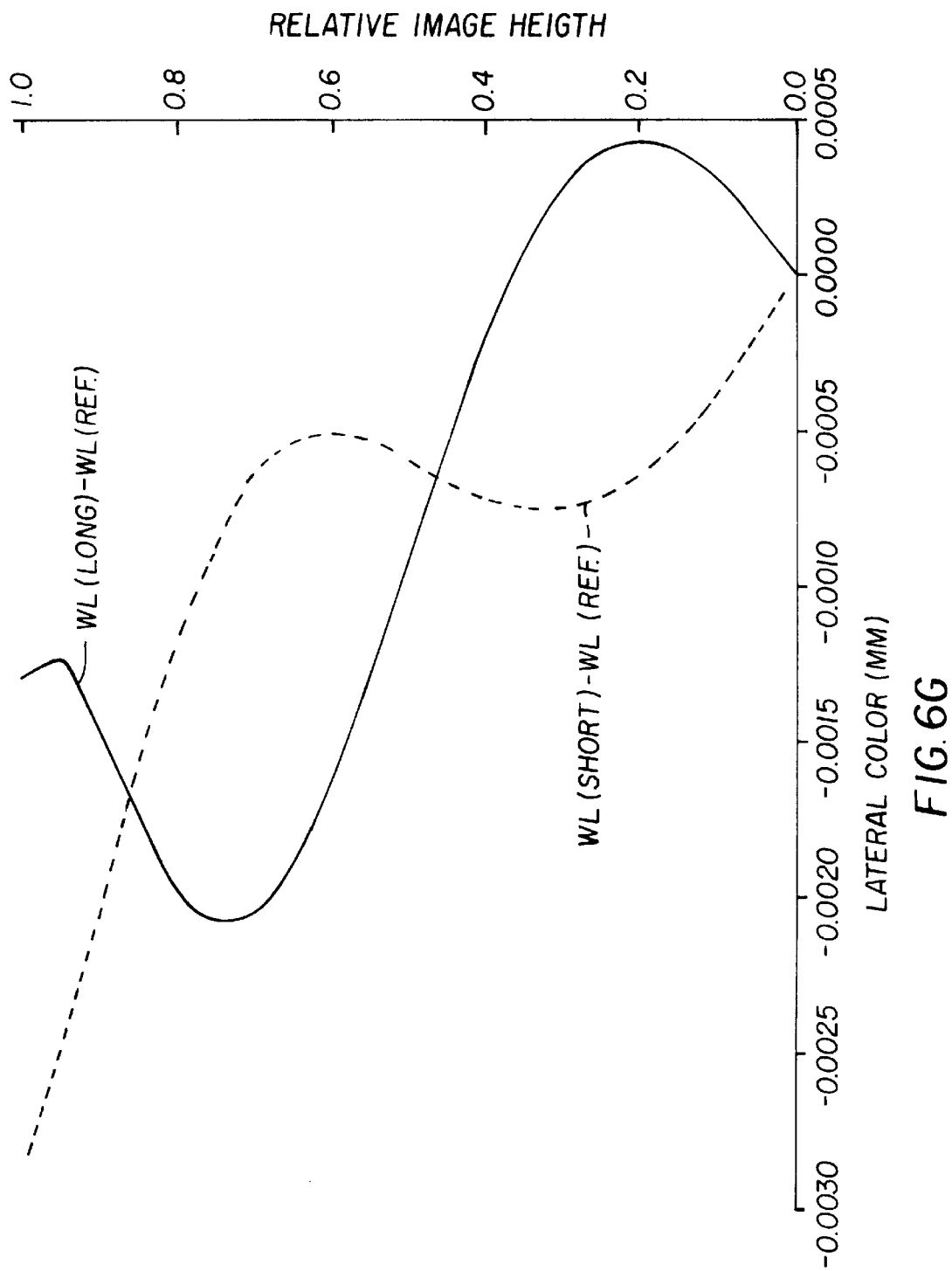
FIG. 6G is a plot of the through focus Modulation Transfer Function (MTF) of the magnifier lens illustrated in FIG. 5.

A magnifier lens 300 of a third embodiment of the present invention is depicted in FIG. 5. This magnifier lens also includes three lens elements $E_1$, $E_2$, $E_3$ The front lens element $E_1$ is a biconvex lens element. Its front, eye side surface is aspheric. This aspheric surface controls third and higher order monochromatic aberrations. The middle lens element $E_2$ is a negative power meniscus lens element. The middle lens element $E_2$ controls color aberrations. This middle lens element $E_2$ of the third embodiment is not cemented to any other lens element. It is oriented differently than the middle lens elements of the two previously discussed embodiments—the convex surface is facing lens element $E_1$. The convex surface of this lens element $E_2$ is a diffractive surface with aspherical components. Its function is similar to that of diffractive surfaces of the first and second embodiments. Both lens elements $E_1$, $E_2$ are plastic and can be easily molded. The rear lens element $E_3$ is a meniscus lens element, concave towards the rear side—i.e., the object side. It is made of glass with an index $N_d$ of 1.734. This relatively high index of refraction minimizes astigmatism. The concave surface of this rear lens element $E_3$ is aspheric. This surface corrects field curvature, distortion and astigmatism and is positioned within 5 mm of an object to be viewed, such as the image display 30.

In this third embodiment, the focal length $f_1$ of the front lens element $E_1$ is 19.8 mm. The focal length $f_2$ of the middle lens element $E_2$ is −20.8 mm, and the focal length $f_3$ of the rear lens element $E_3$ is 17.9 mm. Thus, the rear lens element $E_3$ of this embodiment has positive optical power and is much stronger than its corresponding rear lens elements of the first and second embodiments.

Figure 7:
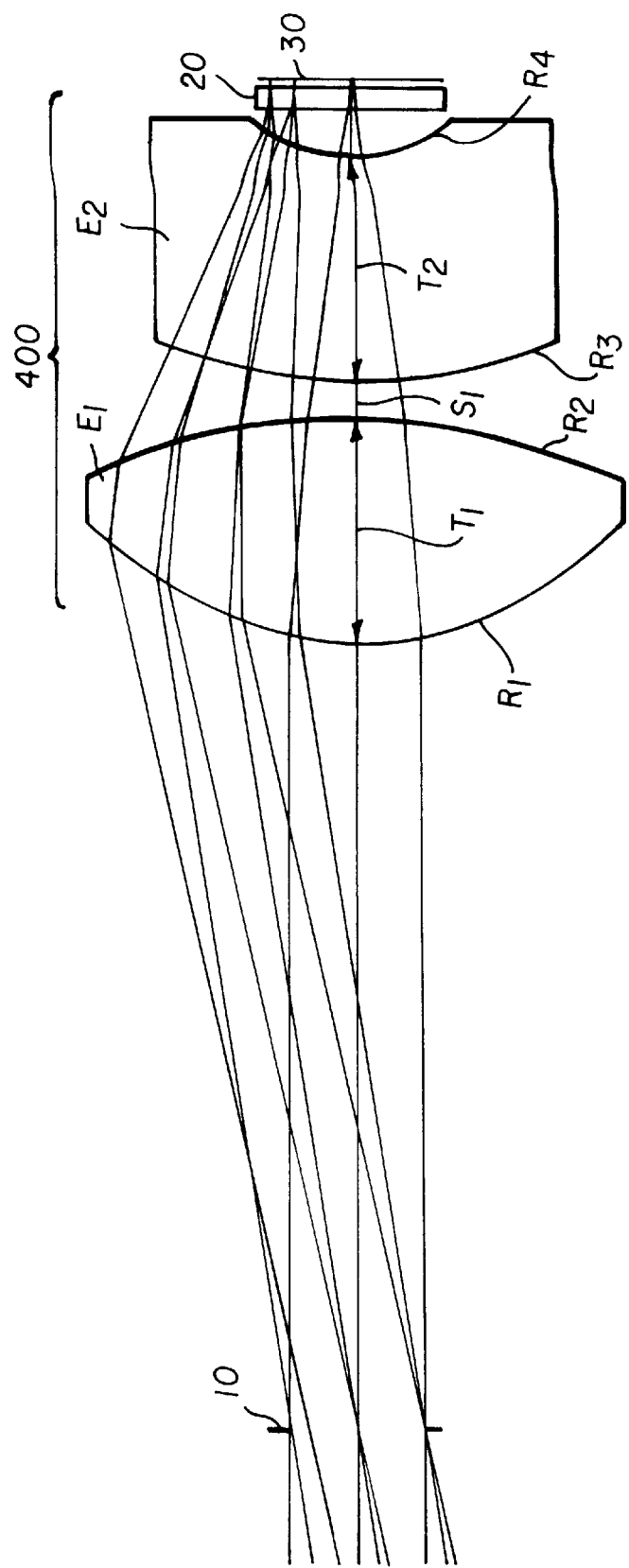
FIG. 7 is a sectional view of the magnifier lens of a fourth illustrative embodiment.
Figure 8A:
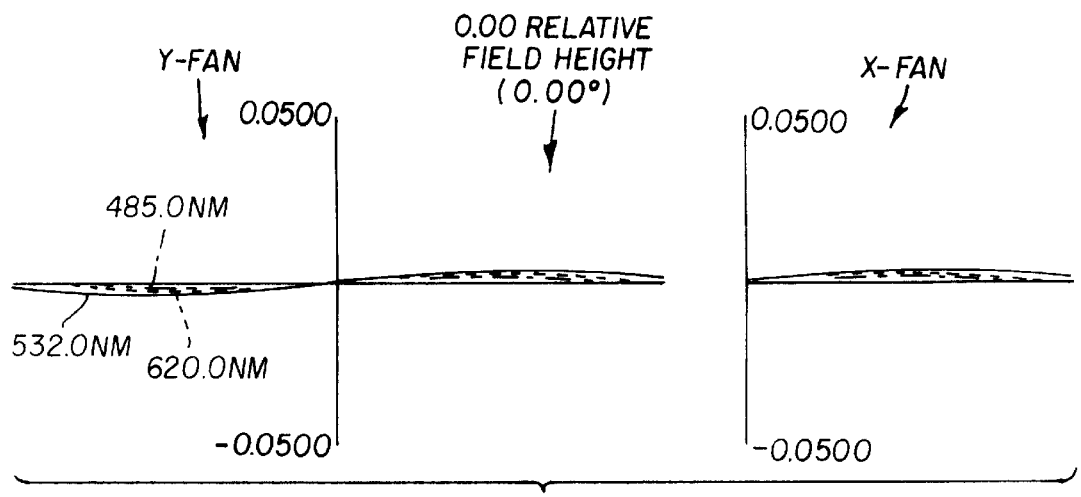
Figure 8B:
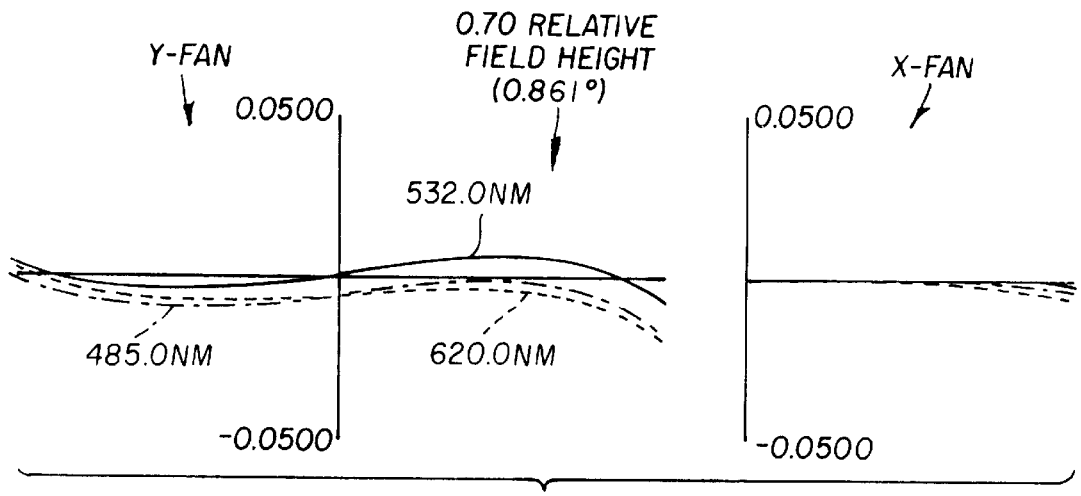
Figure 8C:
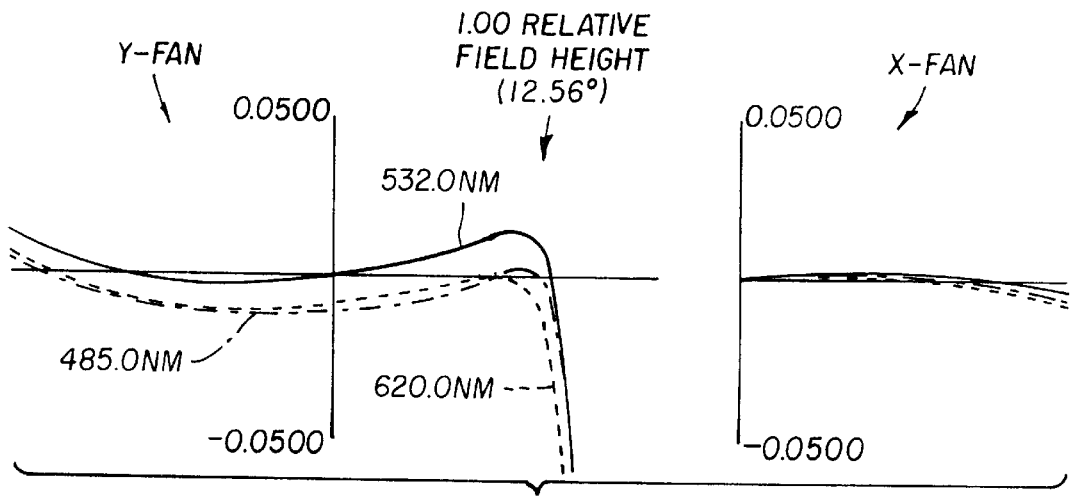
Figure 8F:
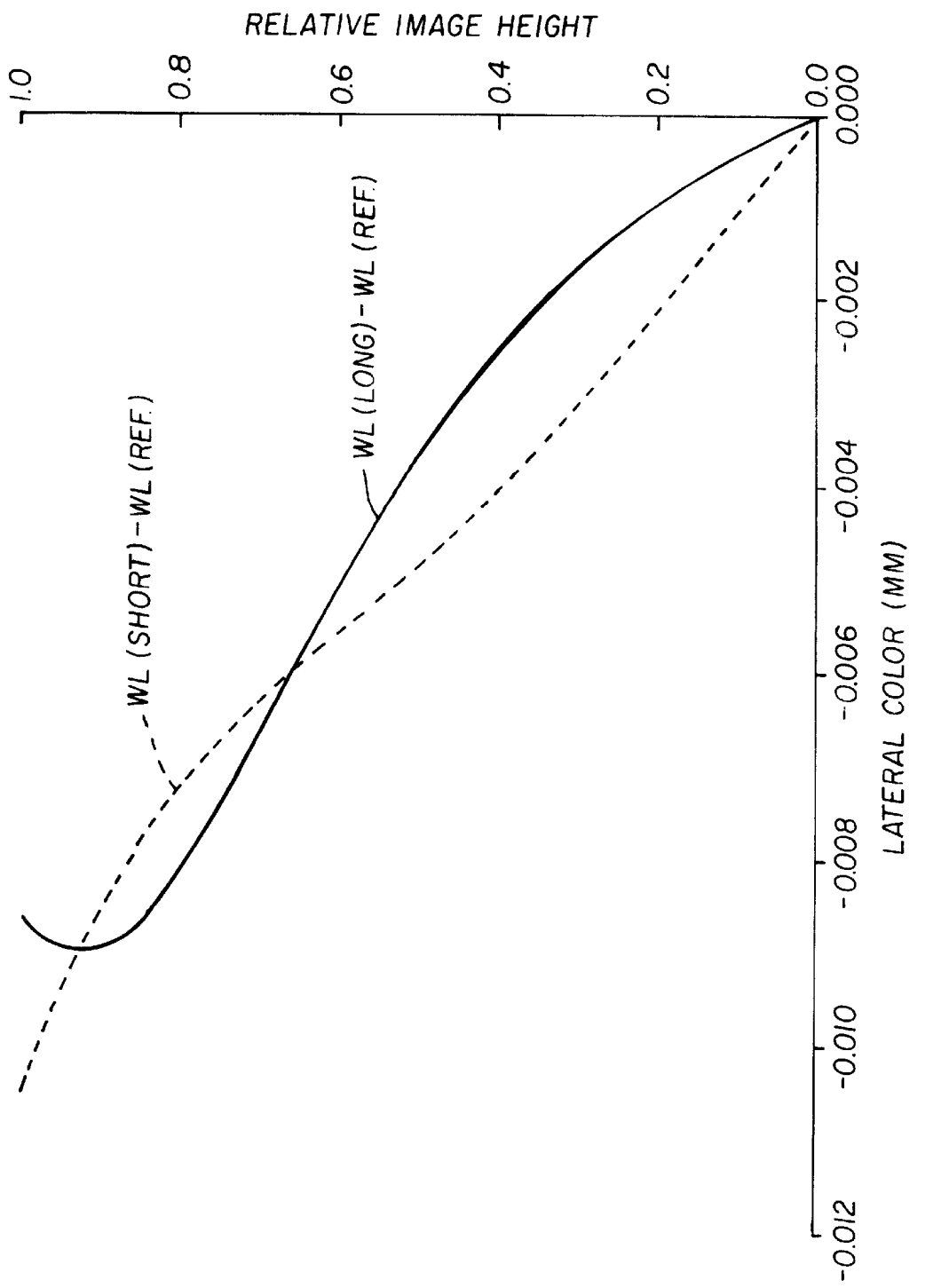
Figure 8G:
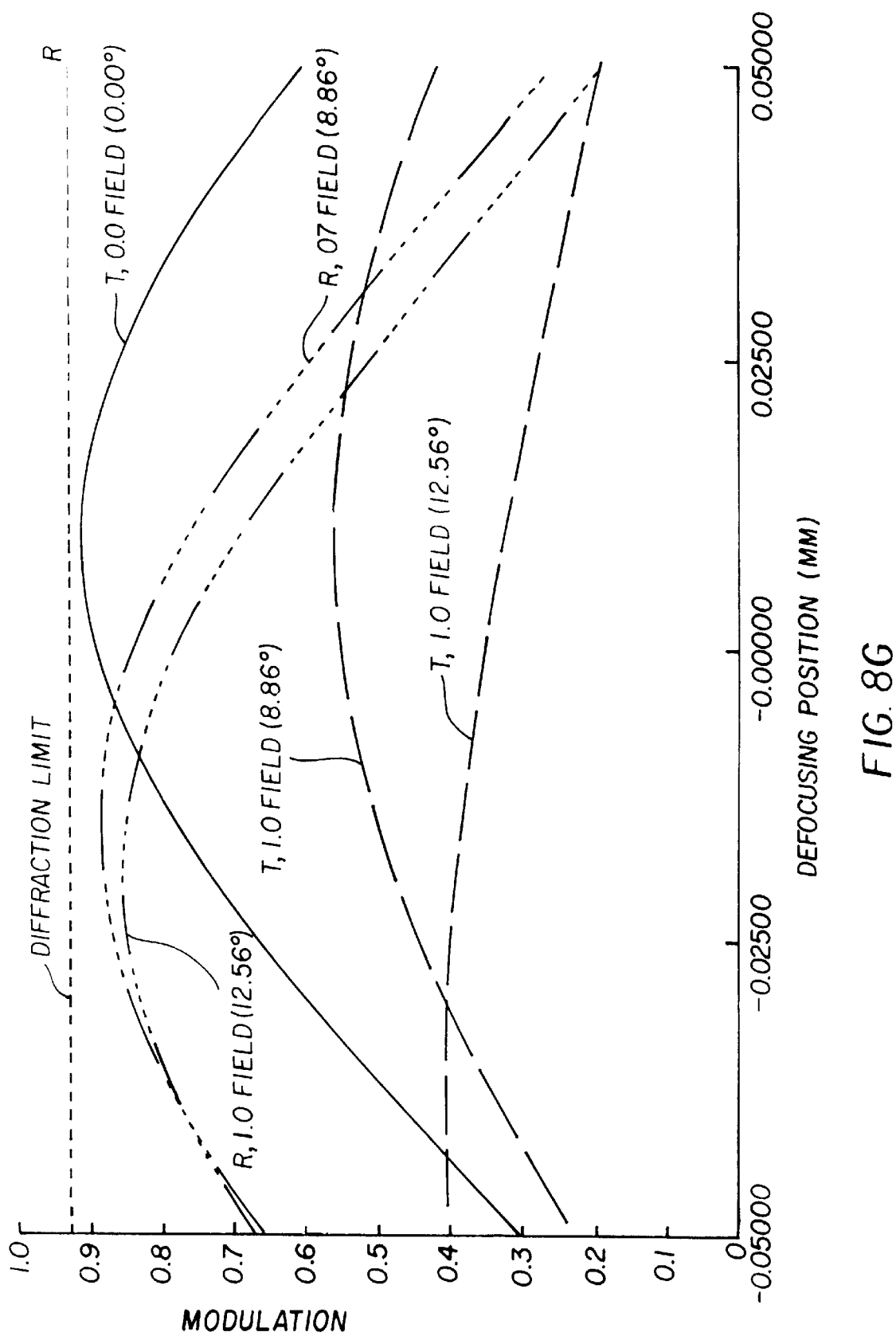
FIG. 8G is a plot of the through focus Modulation Transfer Function (MTF) of the magnifier lens illustrated in FIG. 7.

A magnifier lens 400 of a fourth embodiment of the present invention is depicted in FIG. 7. This magnifier lens also includes two lens elements $E_1$ and $E_2$. The front lens element $E_1$ is a biconvex lens element. It is plastic and has an index $N_d$=1.492 and an Abbe V-number $V_d$=57.4. Its front, eye side surface is aspheric. This aspheric surface controls third and higher order monochromatic aberrations. The rear surface (i.e., the object facing surface) of the front lens element is a diffractive surface. This diffractive surface controls the third and the higher order aberrations and minimizes lateral color aberration. The rear lens element $E_2$ is a negative power meniscus lens element. Its convex surface is facing lens element $E_1$. The concave surface of this rear lens element $E_3$ is aspheric. This surface corrects field curvature, distortion and astigmatism and is positioned within 5 mm of an object to be viewed, such as the image display 30. The rear lens element $E_2$ is plastic and has an index $N_d$ of 1.564 and the V-number of 32.8. Thus, the two lens elements have V-numbers that differ by about 25. This large difference in V-numbers minimizes axial color aberration. Both lens elements $E_1$, $E_2$ are plastic and can be easily molded.

In this fourth embodiment, the focal length $f_1$ of the front lens element $E_1$ is 17.98 mm. The focal length of the rear lens element $E_2$ is −66.88 mm. The ratio of two focal length $f_1/f_2$ is −0.269. Thus, the majority of optical power in the magnifier lens 400 of the fourth embodiment of the present invention comes from the front lens element.

Figure 9:
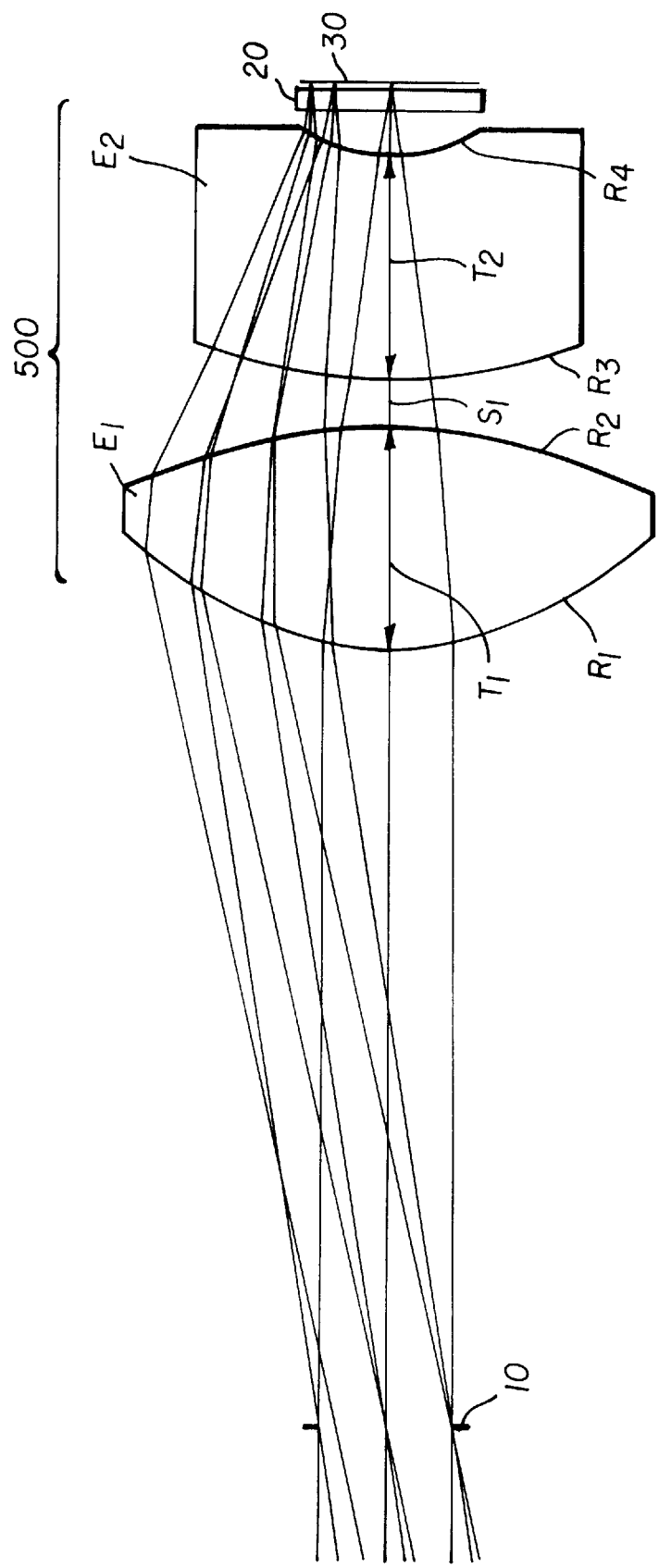
FIG. 9 shows a sectional view of the magnifier lens of a fifth illustrative embodiment.
Figure 10A:
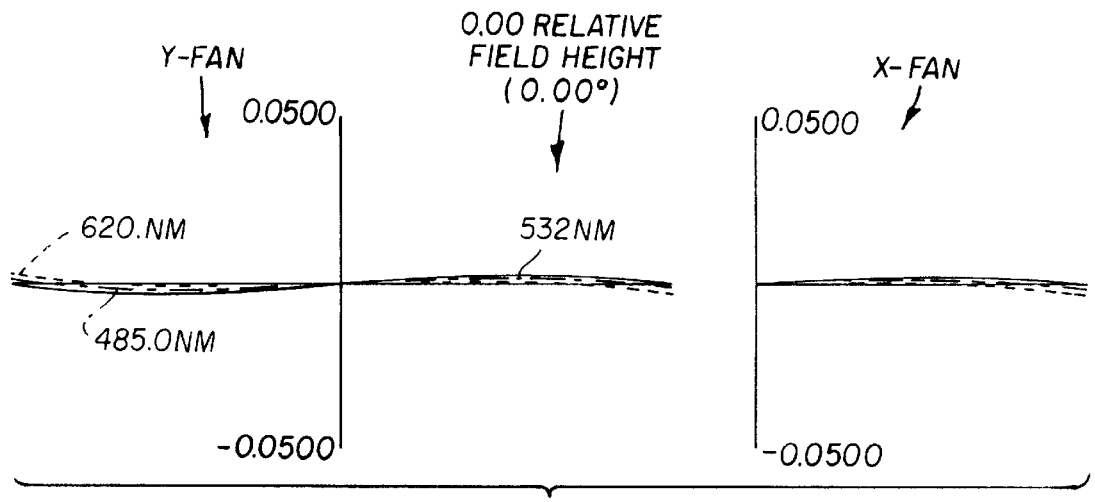
Figure 10B:
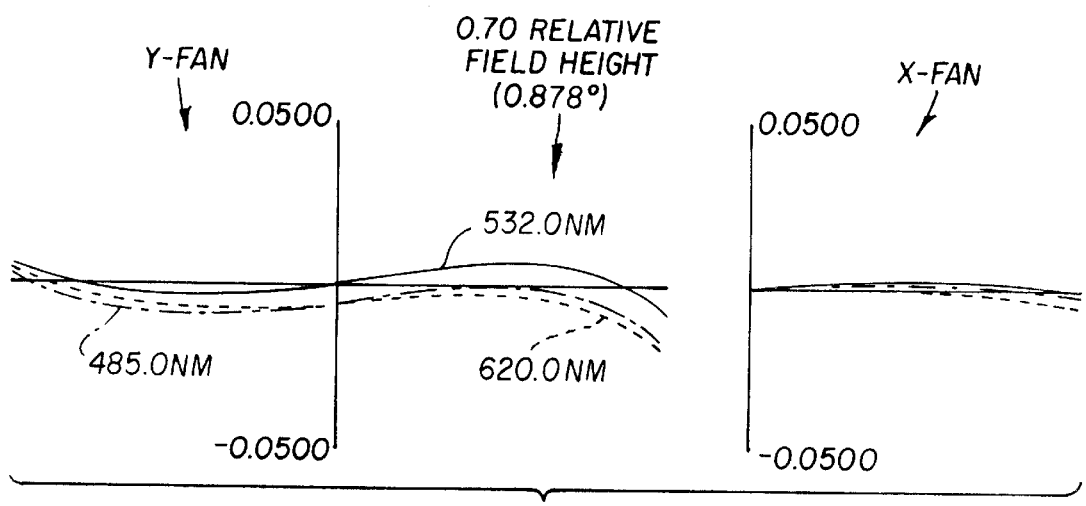
Figure 10C:
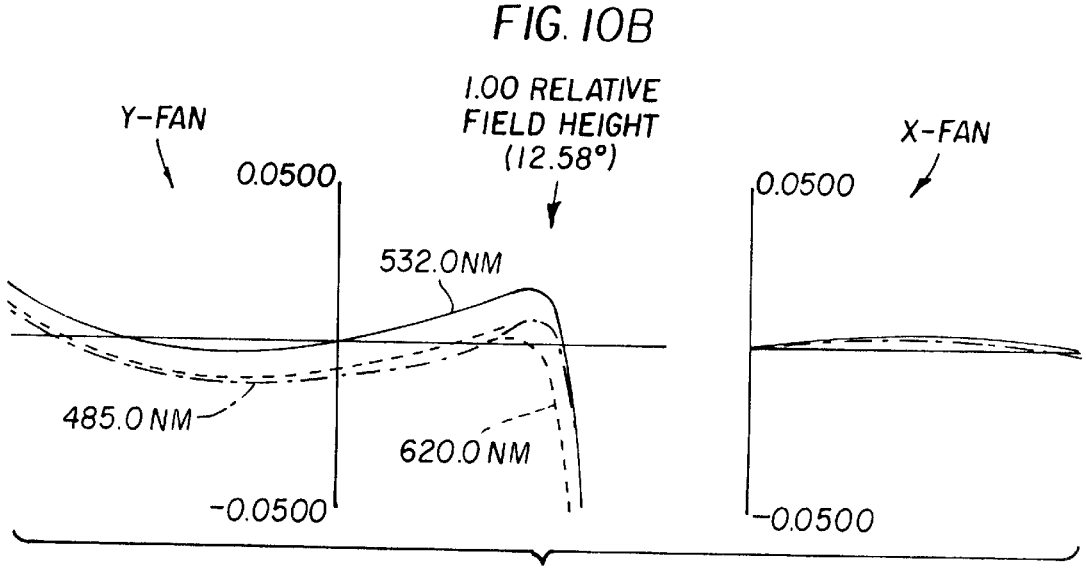
Figure 10F:
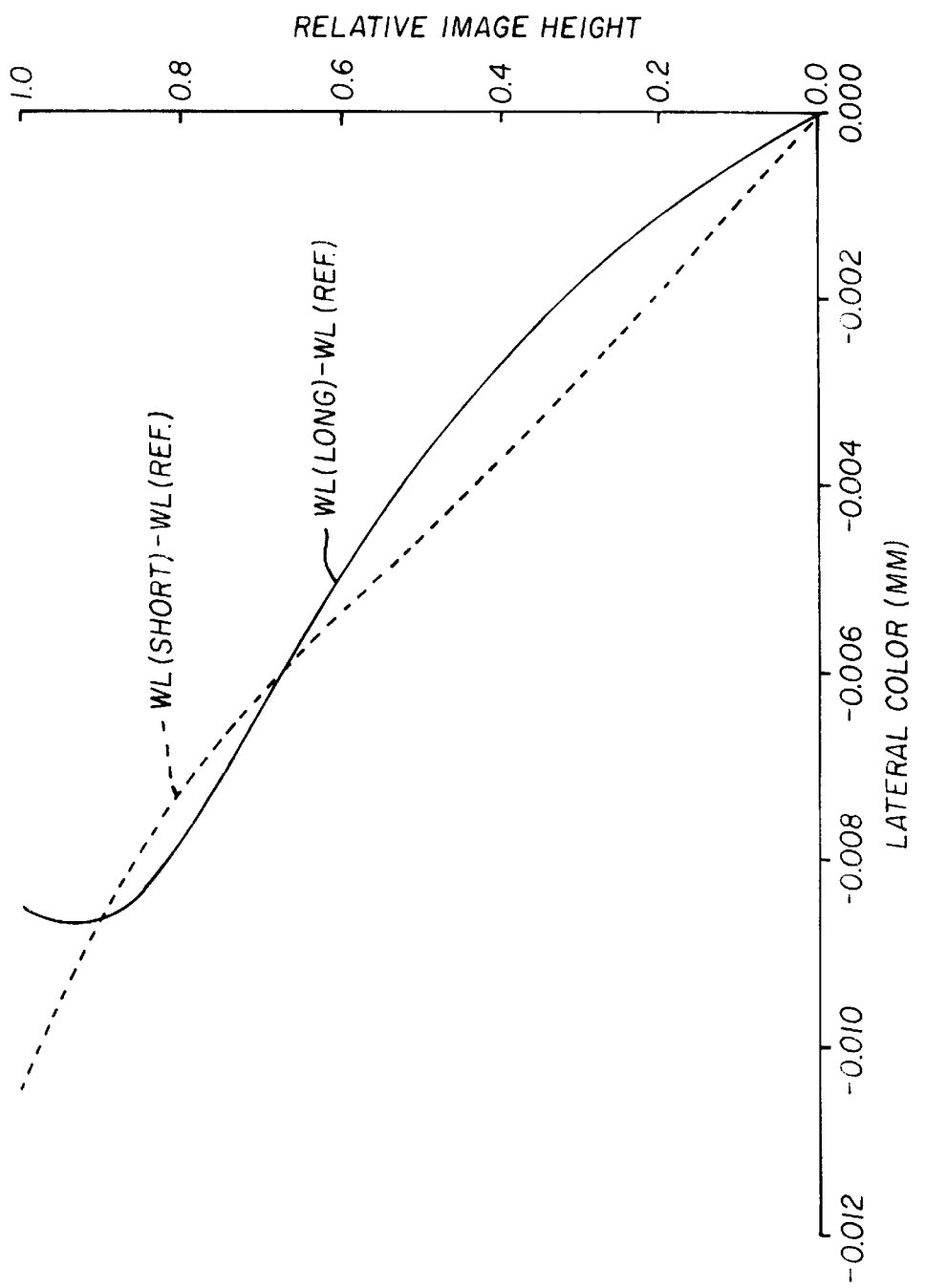

A magnifier lens 500 of the fifth embodiment is depicted in FIG. 9. The magnifier lens 500 is similar to that of the fourth embodiment, but it utilizes a higher index material (glass, $N_d$=1.805) for its rear lens element $E_2$. This improves aberration control, especially astigmatism and color. The focal length $f_1$ of the front lens element of the fifth illustrative embodiment is about 17.72 mm. The focal length $f_2$ of the rear lens element $E_2$ of the fifth illustrative embodiment is about −36.84mm. The ratio of two focal lengths $f_1/f_2$ is −0.481.

Figure 11:
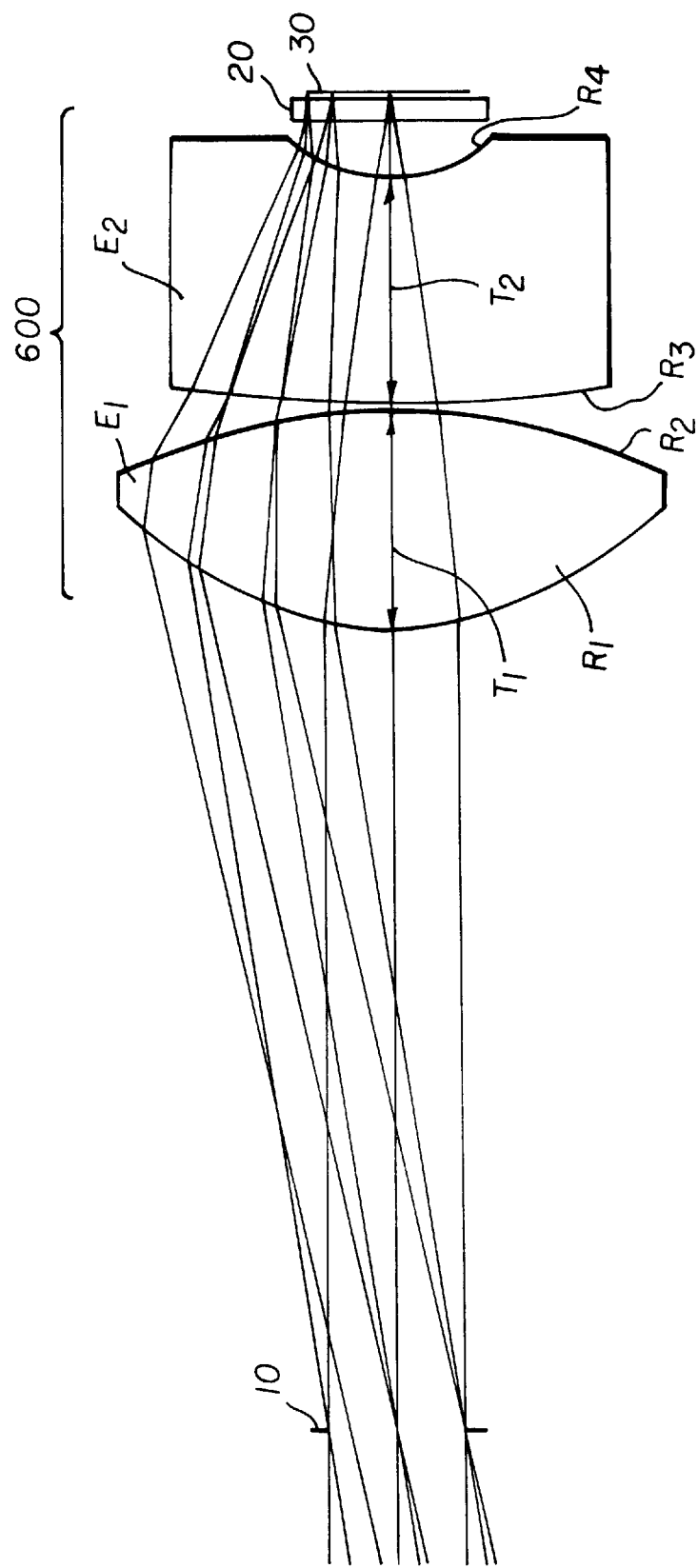
FIG. 11 is a sectional view of the magnifier lens of a sixth illustrative embodiment.
Figure 12A:
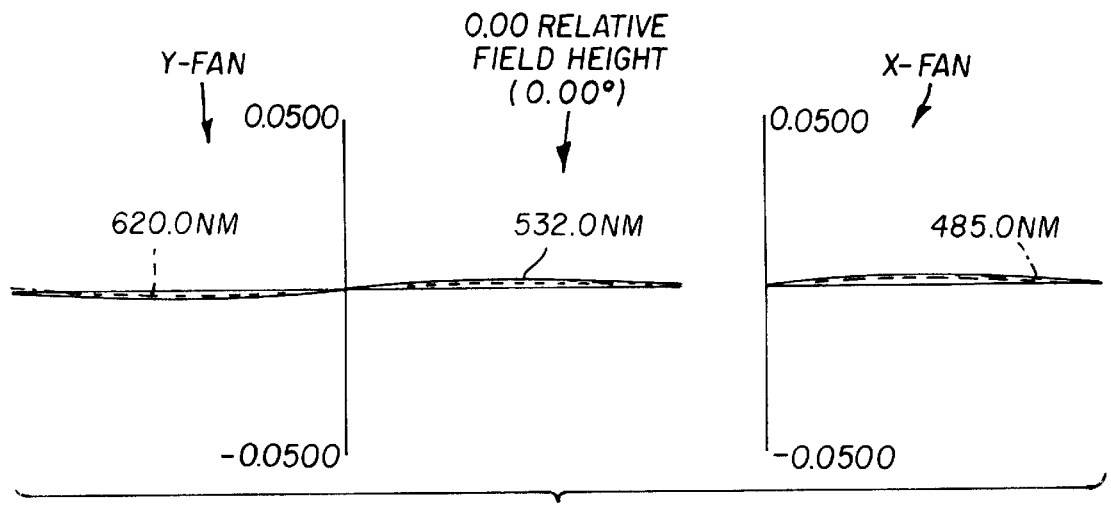
Figure 12B:
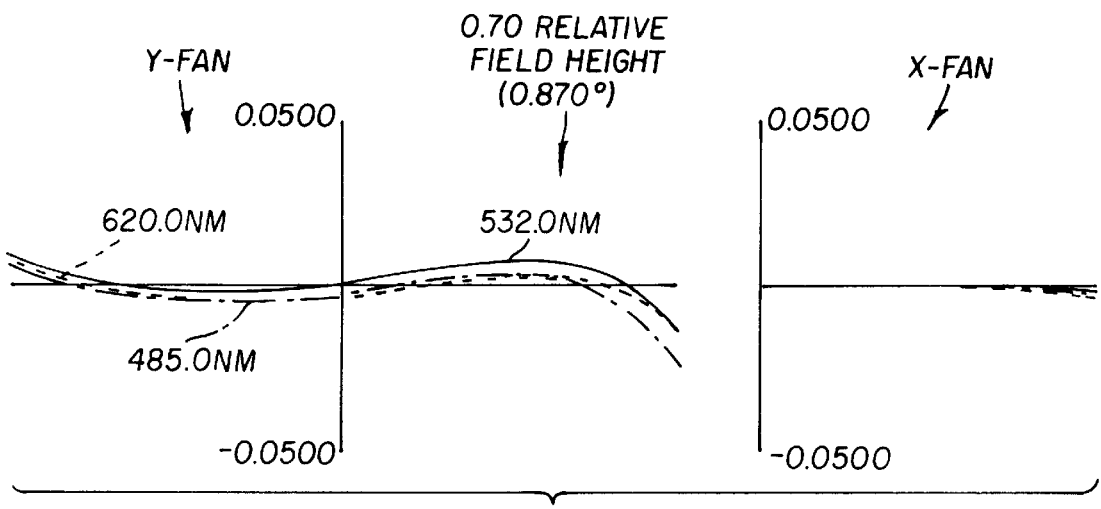
Figure 12C:
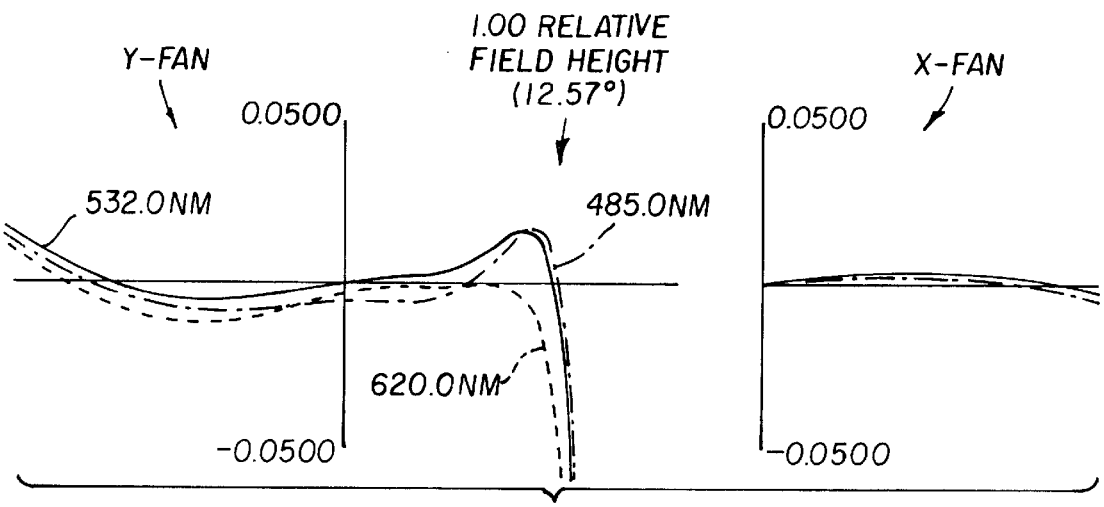
Figure 12F:
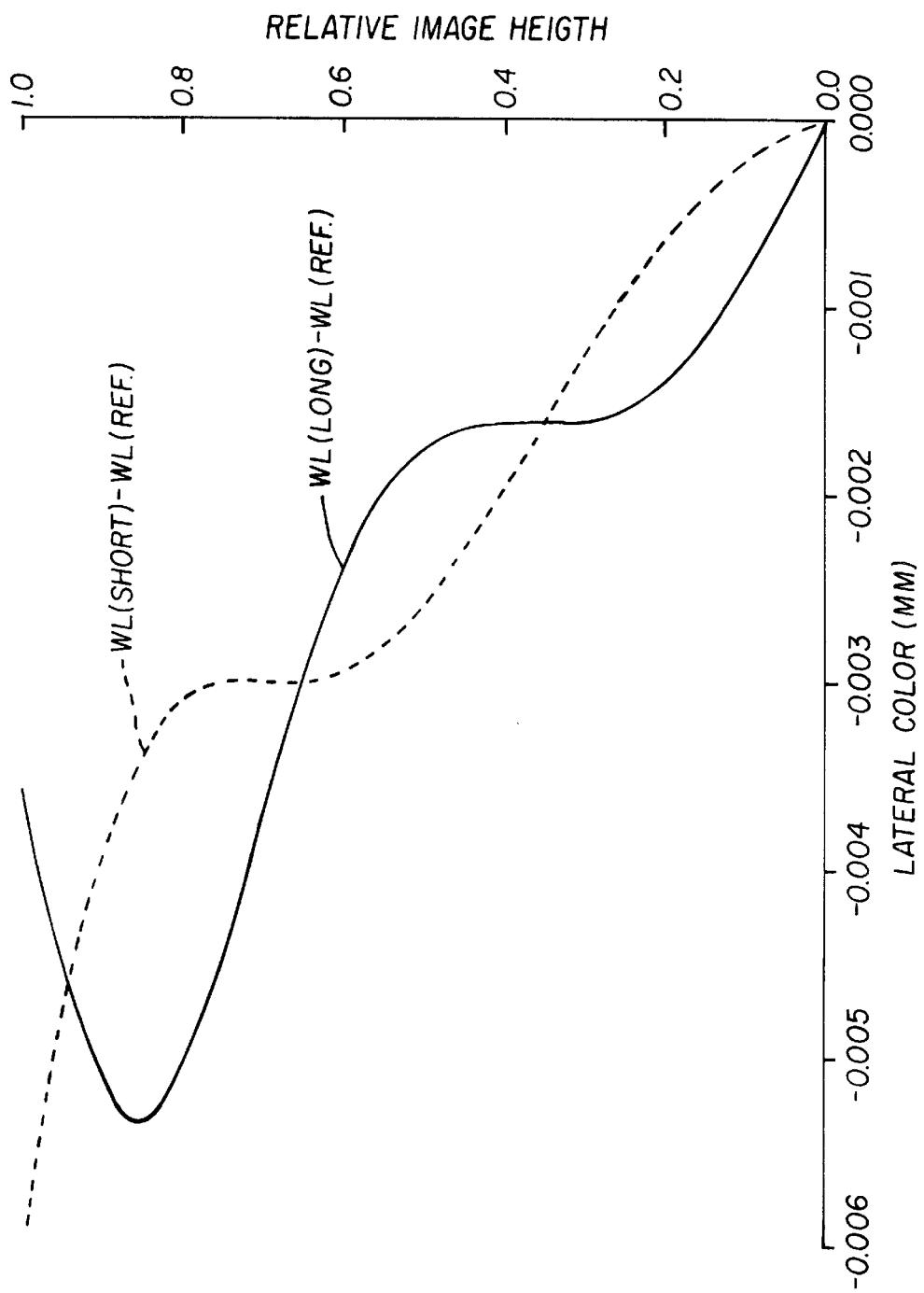
Figure 12G:
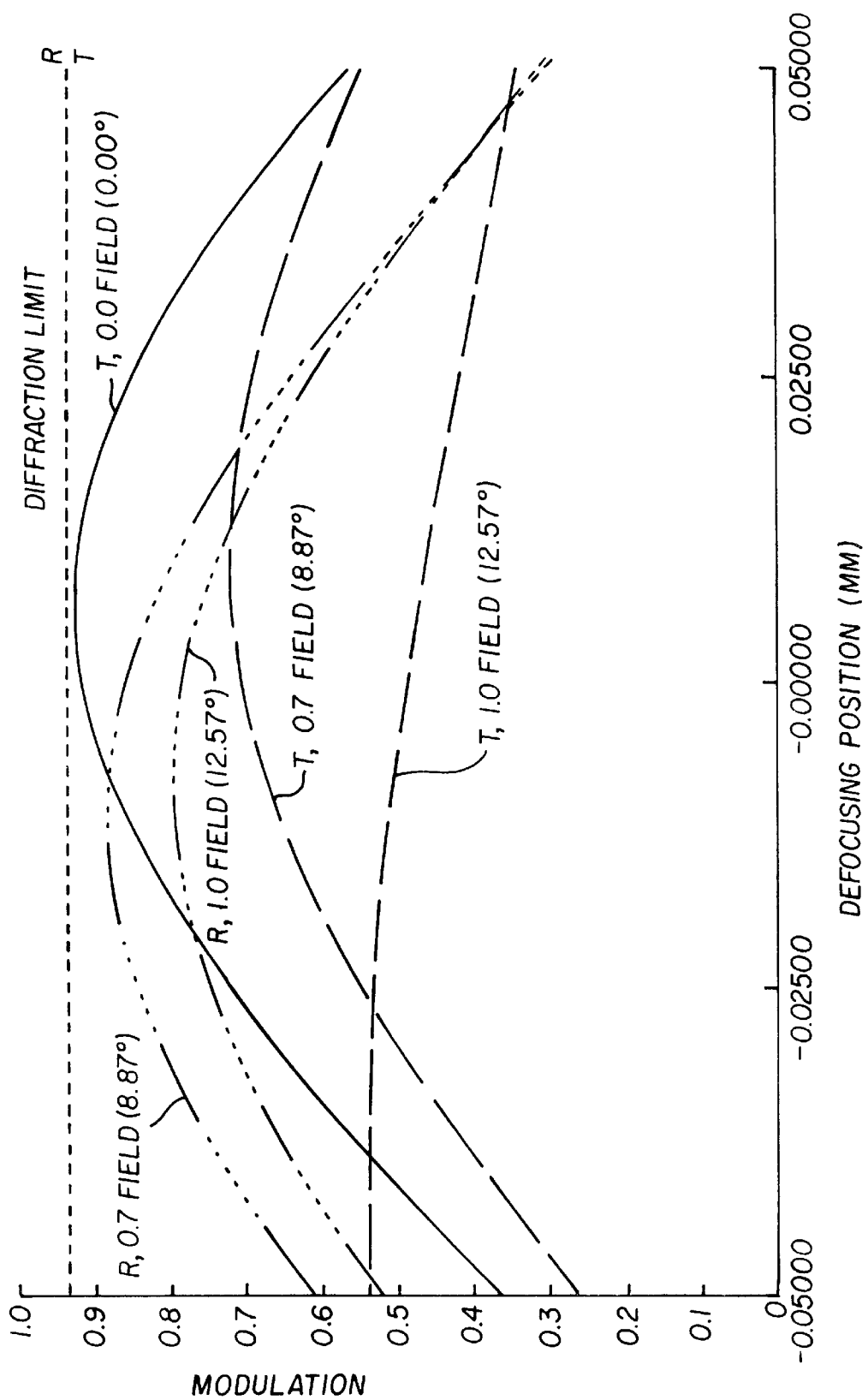
FIG. 12G is a plot of the through focus Modulation Transfer Function (MTF) of the magnifier lens illustrated in FIG. 11.

A magnifier lens 600 of the sixth embodiment is depicted in FIG. 11. The magnifier lens 600 is also similar to that of the fourth embodiment, but its front lens element $E_1$ is glass. The focal length $f_1$ of the front lens element $E_1$ of the sixth illustrative embodiment is about 15.71 mm. The focal length $f_2$ of the rear lens element $E_2$ of the sixth illustrative embodiment is about −32.92 mm. The ratio of two focal lengths $f_1/f_2$ is −0.477.

ASPHERIC AND DIFFRACTIVE SURFACES

The magnifier lenses 100, 200, 300, 400, 500 and 600 have aspheric and diffractive surfaces. The aspheric equation describing these aspheric surfaces is:

$$X = \frac{CY^2}{1+\sqrt{1-(K+1)C^2Y^2}} + DY^4 + EY^6 + FY^8 + GY^{10} + HY^{12} + IY^{14} + JY^{16} + KY^{18}$$

where:

X is the distance along the optical axis OA;

Y is the height from the optical axis;

C is the reciprocal of the vertex radius of curvature of the curved lens surface;

K is the conic coefficient; and

D through K are aspheric coefficients of 4th, 6th, 8th, 10th, 12th, 14th, 16th, and 18th order. The values of the aspheric coefficients for the various aspheric lens surfaces for the six lens embodiments are provided in Tables 1 through 6.

The diffractive surfaces are described by the following phase equation:

$$\Phi(Y) = \frac{2\pi}{\lambda_0}[C_1Y^2 + C_2Y^4 + C_3Y^6 + C_4Y^8 + C_5Y^{10}]$$

where $C_1$, $C_2$, $C_3$, $C_4$ and $C_5$ coefficients for the diffractive surface.

FIGS. 2A–2G, 4A–4G, 6A–6G, 8A–8G, 10A–10G, 12A–12G detail the performance of magnifier lenses 100, 200, 300, 400, 500 and 600, respectively. Included are ray traces for the various field positions, field curvature, distortion and lateral color plots, and the through focus MTF (Modulation Transfer Function). More specifically, FIGS. 2A, 4A, 6A, 8A, 10A and 12A are ray intercept plots (on axis field of view). FIGS. 2B, 4B, 6B, 8B, 10B and 12B are ray intercept plots for the six lens embodiments at 0, 0.7, field of view. FIGS. 2C, 4C, 6C, 8C, 10C, and 12C are ray intercept plots for the full field of view.

Figure 2A:
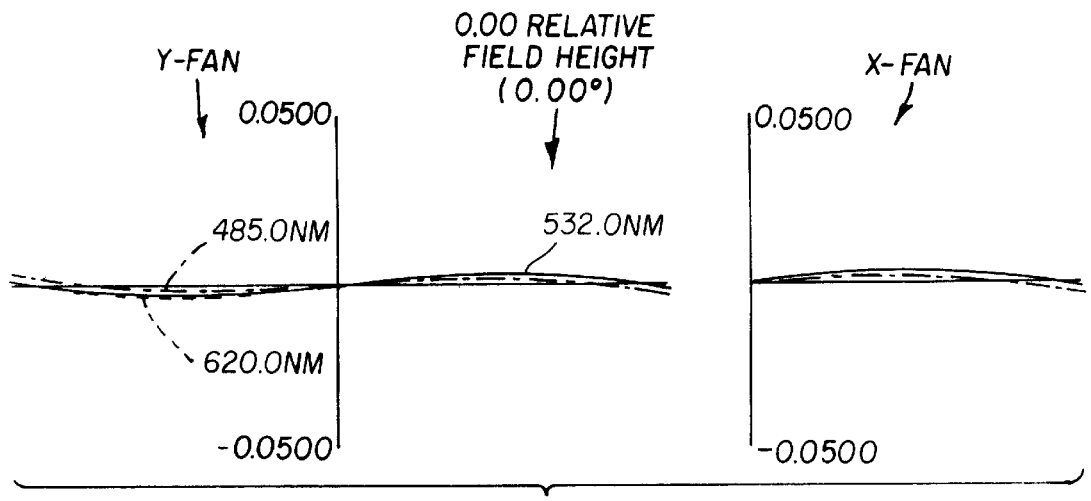
FIGS. 2A–2F are graphical representations of the aberrations of the magnifier lens illustrated in FIG. 1.
Figure 2B:
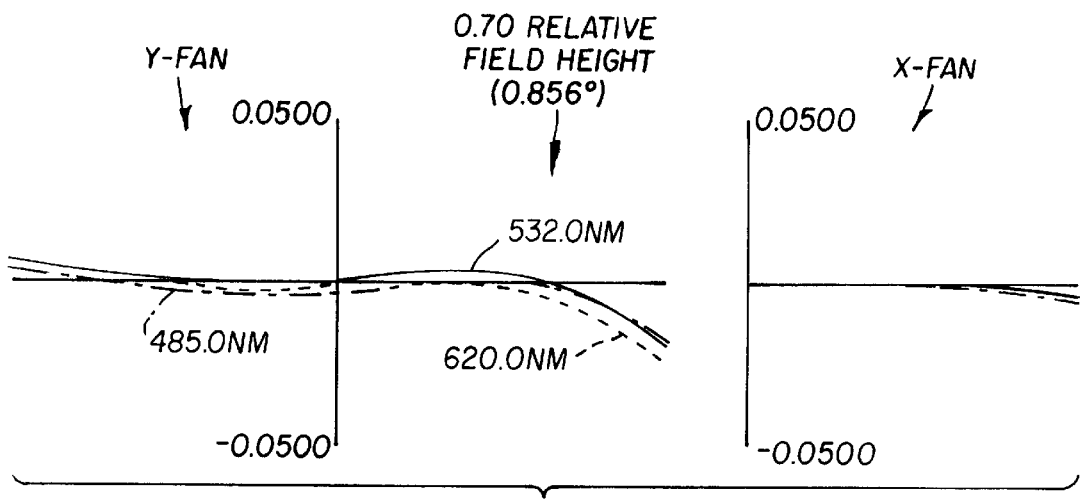
Figure 2C:
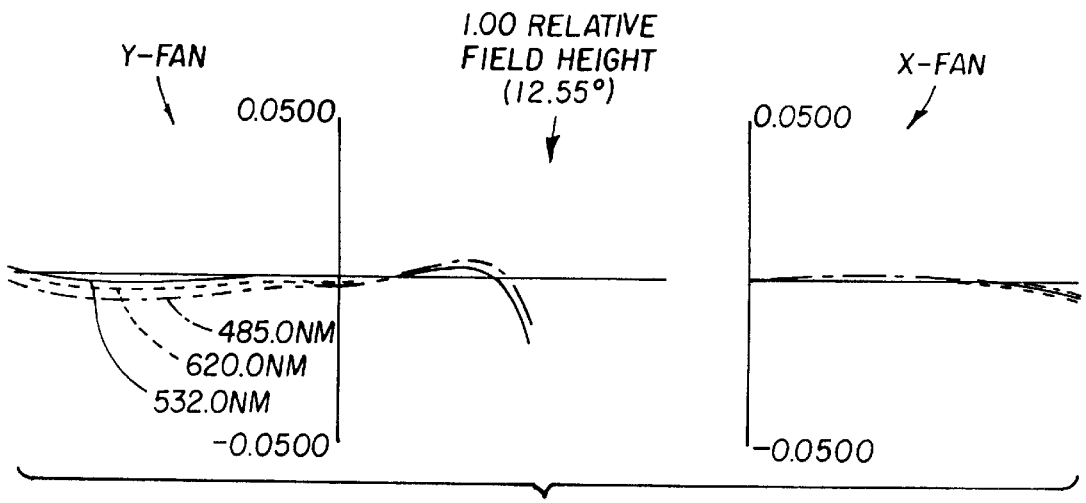
Figure 2E:
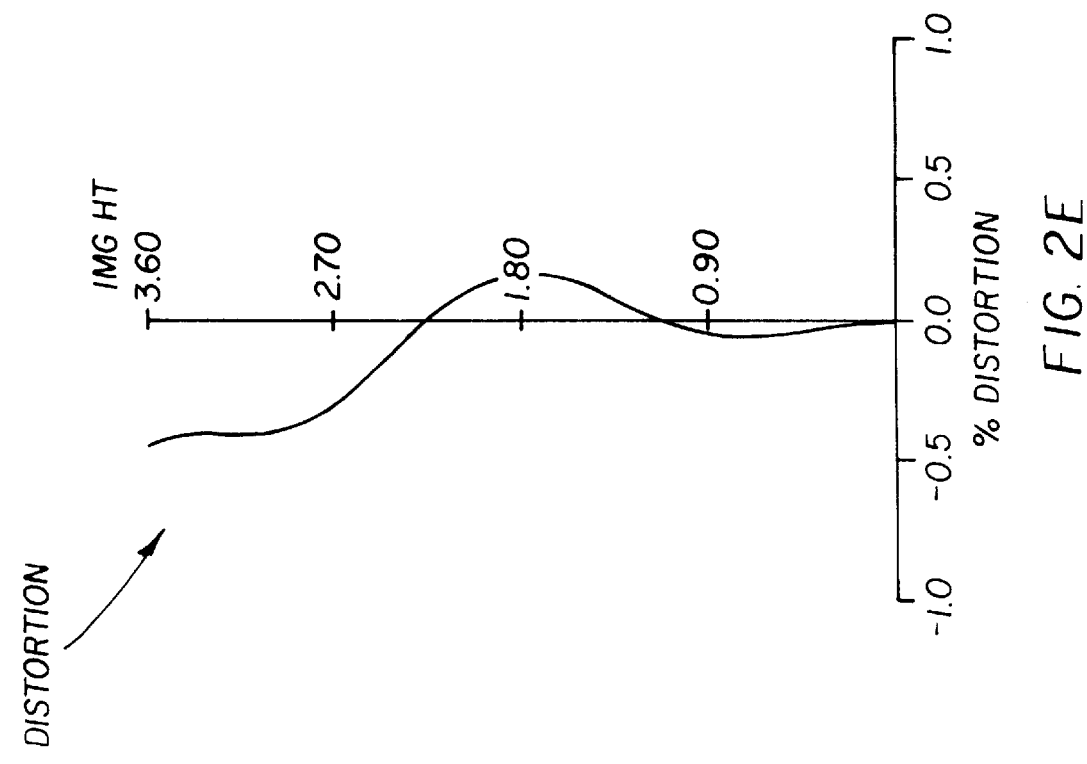
Figure 2D:
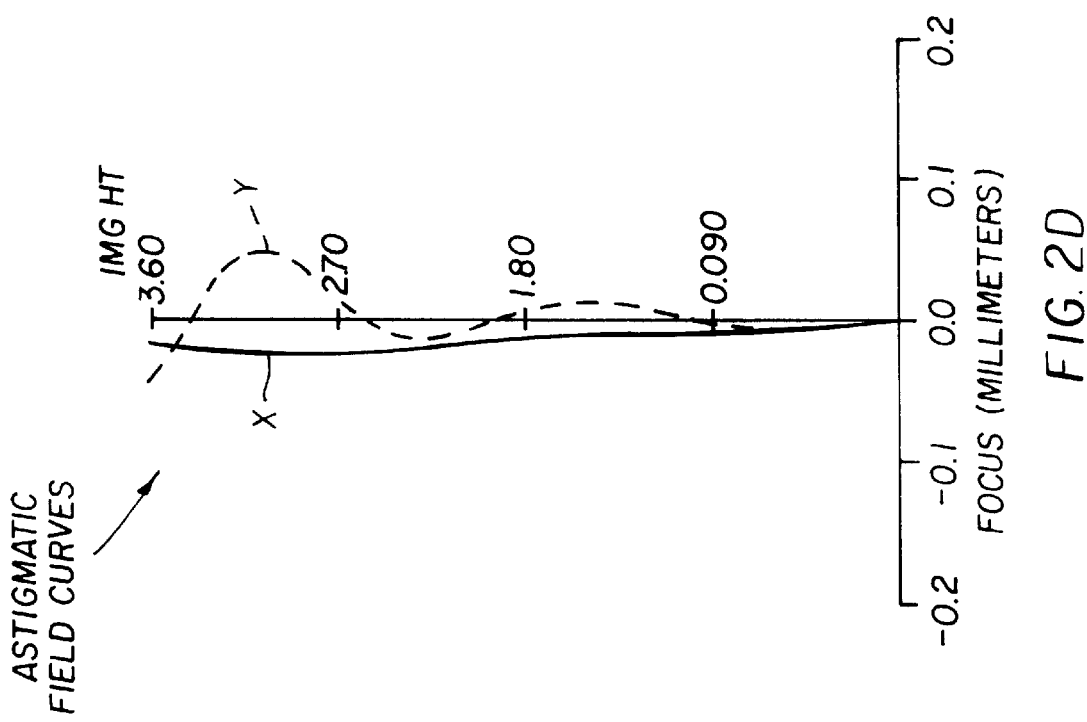
Figure 2F:
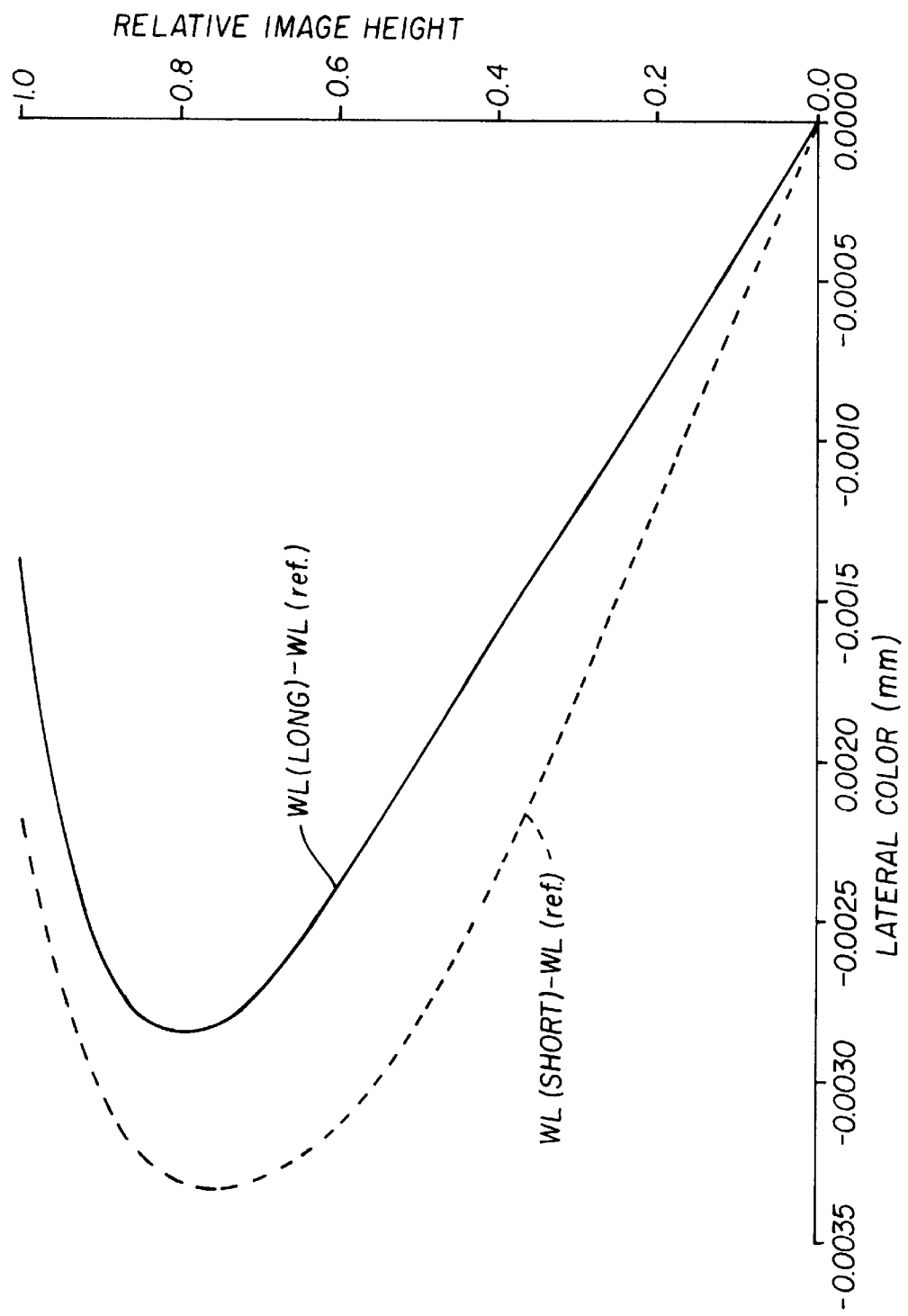
Figure 2G:
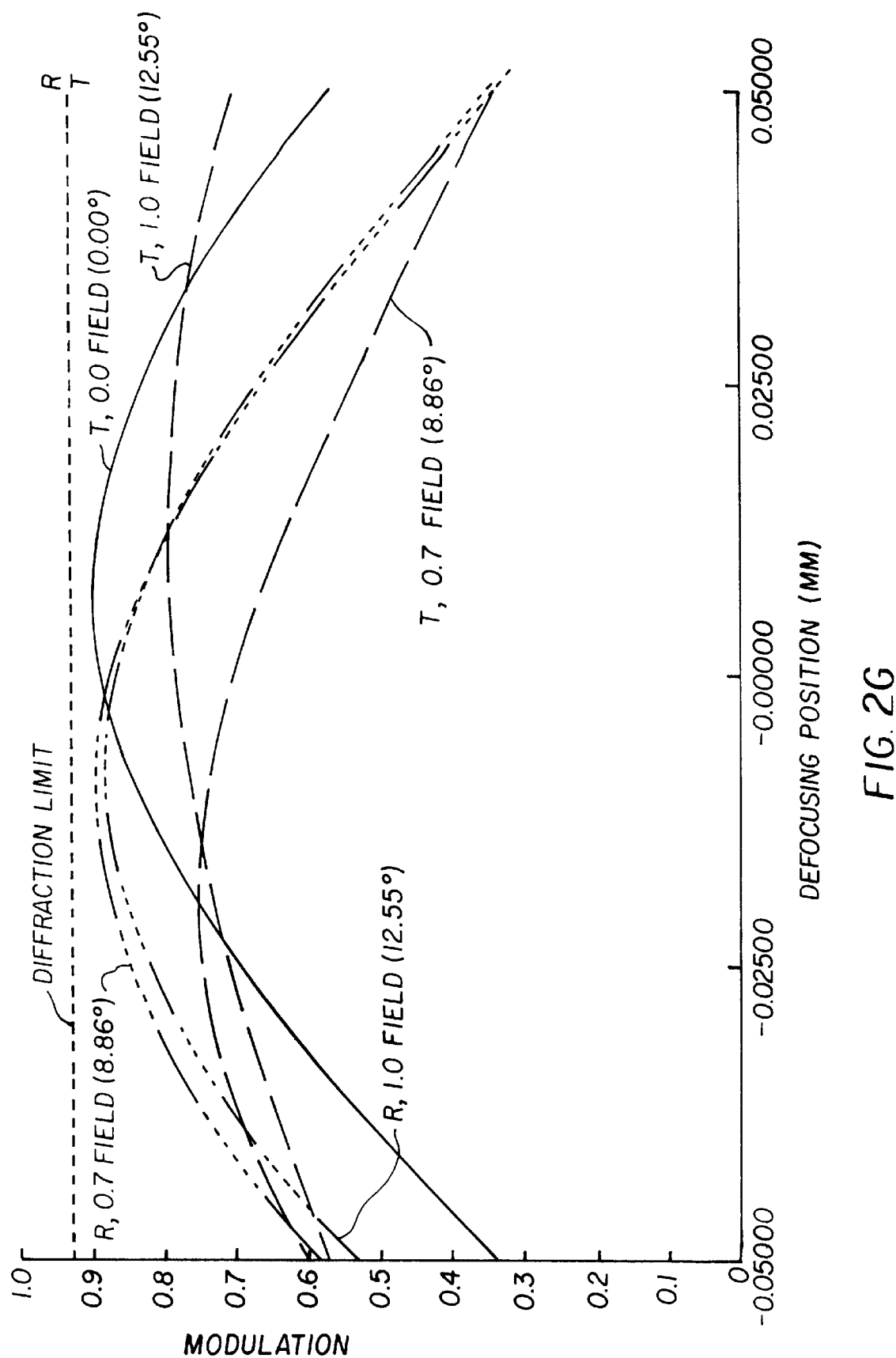
FIG. 2G is a plot of the through focus Modulation Transfer Function (MTF) of the magnifier lens illustrated in FIG. 1.

FIGS. 2D–2F represent astigmatism, distortion and lateral color for the magnifier lens 100, respectively. FIG. 2G is a plot of the modulation transfer function. Similarly, FIGS. 4D–4G, 6D–6G, 8D–8G, 10D–10G and 12D–12G represent astigmatism, distortion lateral color and MTF values for the magnifier lenses of the second through six embodiments, respectively.

The MTF curves are plotted against the amount of defocus in millimeters, for a set of tangential (T) and Radial (R) rays for the axis; 0.7 and full field of view, for an object distance at −1500 millimeters (measured from surface 10), with a 6 mm pupil diameter, at a spacial frequency of 40.0 cycles per millimeter. Each curve was substantially equally weighted for wavelength of 0.620, 0.532 and 0.485 microns. The depth of focus is measured at an MTF of 0.5.

TABLE 1

|  | RADIUS | DISTANCE OR THICKNESS | INDEX Nd | Vd |
|---|---|---|---|---|
| 10 | Diaphragm | 35.0 |  |  |
| $R_1$ | Asphere | 10.940 | 1.492 | 57.4 |
| $R_2$ | −13.0000 | 2.000 | 1.564 | 32.8 |
| $R_3$ | −21.2393* | .300 |  |  |
| $R_4$ | 10.8692 | 7.172 | 1.492 | 57.4 |
| $R_5$ | Asphere |  |  |  |

The coefficients for surfaces $R_1$ and $R_5$ are:
Surf. $R_1$   C = .071591     D = −.457721E-04     F = −.542308E-08
              K = 0.000000    E = −.202331E-06     G = .101887E-09
              Vertex Radius (1/C) = 13.9683
Surf. $R_5$   C = .154784     D = .629361E-03      F = −.834232E-05
              K = 0.000000    E = .944249E-04      G = .374004E-06
              Vertex Radius (1/C) = 6.4606
*The coefficients for the diffractive surface $R_3$ are:
     $C_1$ = 2.0882E-03   $C_3$ = −1.7760E-09   $C_5$ = 0
     $C_2$ = −5.8201E-06  $C_4$ = 0
     $\lambda_0$ = 532.0 nm

TABLE 2

| | RADIUS | DISTANCE OR THICKNESS | INDEX Nd | Vd |
|---|---|---|---|---|
| 10 | Diaphragm | 35.0 | | |
| $R_1$ | Asphere | 11.911 | 1.492 | 57.4 |
| $R_2$ | −13.0000 | 2.900 | 1.564 | 32.8 |
| $R_3$ | −21.0022* | .3 | | |
| $R_4$ | 10.6081 | 6.650 | 1.734 | 51.1 |
| $R_5$ | Asphere | | | |

The coefficients for surfaces $R_1$ and $R_5$ are:
Surf. $R_1$  $C = .066174$   $D = −.338879E-04$   $F = −.880154E-09$
        $K = 0.000000$  $E = −.245240E-06$   $G = .175546E-10$
        Vertex Radius (1/C) = 15.1116
Surf. $R_5$  $C = .156204$   $D = .536306E-03$    $F = −.551321E-06$
        $K = 0.000000$  $E = .136368E-04$    $G = .648670E-07$
        Vertex Radius (1/C) = 6.4019
*The coefficients for the diffractive surface $R_3$ are:
    $C_1 = 2.1177E-03$   $C_3 = 9.1723E-09$   $C_5 = 1.1957E-12$
    $C_2 = −5.4417E-06$  $C_4 = 2.4296E-10$
    $\lambda_0 = 532.0$ nm

TABLE 3

| | RADIUS | DISTANCE OR THICKNESS | INDEX Nd | Vd |
|---|---|---|---|---|
| 10 | Diaphragm | 35.0 | | |
| $R_1$ | Asphere | 9.173 | 1.492 | 57.4 |
| $R_2$ | −34.7079 | | | |
| $R_3$ | 32.3571* | 3.862 | 1.564 | 32.8 |
| $R_4$ | 7.8500 | .476 | | |
| $R_5$ | 8.4785 | 9.000 | 1.734 | 51.1 |
| $R_6$ | Asphere | | | |

The coefficients for surfaces $R_1$ and $R_6$ are:
Surf. $R_1$  $C = .080183$   $D = −.585403E-04$   $F = .361280E-08$
        $K = 0.000000$  $E = −.302823E-06$   $G = −.948954E-10$
        Vertex Radius (1/C) = 12.4714
Surf. $R_6$  $C = .076930$   $D = .121680E-02$    $F = .358288E-05$
        $K = 0.000000$  $E = −.412049E-04$   $G = −.650446E-07$
        Vertex Radius (1/C) = 12.9988
*The coefficients for the diffractive surface $R_3$ are:
    $C_1 = 1.5060E-03$   $C_3 = -1.8330E-07$  $C_5 = 0$
    $C_2 = 1.0030E-05$   $C_4 = 1.2055E-09$
    $\lambda_0 = 532.0$ nm

TABLE 4

| | RADIUS | DISTANCE OR THICKNESS | INDEX Nd | Vd |
|---|---|---|---|---|
| 10 | Diaphragm | 35.0 | | |
| $R_1$ | Asphere | 9.977 | 1.492 | 57.4 |
| $R_2$ | −28.4048* | 1.759 | | |
| $R_3$ | 23.4922 | 10.000 | 1.564 | 32.8 |
| $R_4$ | Asphere | | | |

The coefficients for surfaces $R_1$ and $R_4$ are:
Surf. $R_1$  $C = .080449$   $D = −.589619B-04$   $F = .126216E-07$
        $K = 0.000000$  $E = −.860812E-06$   $G = −.184134E-09$
        Vertex Radius (1/C) = 12.4303
Surf. $R_4$  $C = .081440$   $D = .177622E-02$    $F = .591441E-05$
        $K = 0.000000$  $E = −.677103E-04$   $G = −.778871E-07$
        Vertex Radius (1/C) = 12.2790
*The coefficients for the diffractive surface $R_2$ are:
    $C_1 = 2.0640E-03$   $C_3 = 9.6018E-09$   $C_5 = -2.5864E-12$
    $C_2 = 2.0200E-06$   $C_4 = 3.0596E-10$
    $\lambda_0 = 532.0$ nm

TABLE 5

| | RADIUS | DISTANCE OR THICKNESS | INDEX Nd | Vd |
|---|---|---|---|---|
| 10 | Diaphragm | 35.0 | | |
| $R_1$ | Asphere | 10.000 | 1.492 | 57.4 |
| $R_2$ | −22.9432* | 1.962 | | |
| $R_3$ | 29.4381 | 10.000 | 1.805 | 25.4 |
| $R_4$ | Asphere | | | |

The coefficients for surfaces $R_1$ and $R_4$ are:
Surf. $R_1$  $C = .082888$   $D = .751750E-04$    $F = .994988E-08$
        $K = 0.000000$  $E = −.857001E-06$   $G = −.177057E-09$
        Vertex Radius (1/C) = 12.0645
Surf. $R_4$  $C = .089849$   $D= .134474E-02$     $F = .855280E-05$
        $K = 0.000000$  $E = −.634209E-04$   $G = −.280603E-06$
        Vertex Radius (1/C) = 11.1298
*The coefficients for the diffractive surface $R_2$ are:
    $C_1 = −1.9373E-03$  $C_3 = 1.0324E-07$   $C_5 = 7.4082E-12$
    $C_2 = 7.7669E-06$   $C_4 = 1.4486E-09$
    $\lambda_0 = 532.0$ nm

TABLE 6

| | RADIUS | DISTANCE OR THICKNESS | INDEX Nd | Vd |
|---|---|---|---|---|
| 10 | Diaphragm | 35.0 | | |
| $R_1$ | Asphere | 9.677 | 1.589 | 61.3 |
| $R_2$ | −27.4509 | .25 | | |
| $R_3$ | 59.2756* | 10.000 | 1.564 | 32.8 |
| $R_4$ | Asphere | | | |

The coefficients for surfaces $R_1$ and $R_4$ are:
Surf. $R_1$  $C = .081755$   $D = .480967E-04$    $F = .131906E-07$
        $K = 0.000000$  $E = −.105922E-05$   $G = −.186885E-09$
        Vertex Radius (1/C) = 12.2316
Surf. $R_4$  $C = .085831$   $D = .111194E-02$    $F = .237160E-05$
        $K = 0.000000$  $E = −.131699E-04$   $G = −.241665E-07$
        Vertex Radius (1/C) = 11.6508
*The coefficients for the diffractive surface $R_3$ are:
    $C_1 = −2.2262E-03$  $C_3 = 9.01OOE-07$   $C_5 = −9.3902E-11$
    $C_2 = 2.1628E-05$   $C_4 = 1.5392E-08$
    $\lambda_0 = 532.0$ nm The above examples satisfy a special need for a magnifier lenses having a relatively large stop distance of more than twice the focal length (providing an exceptionally good eye relief). The magnifier lenses are light weight and provide exceptional performance for their cost. The magnifier lenses exhibit superior quality and are color corrected over the entire visible special range while providing a half field of view of at least 10 degrees and a magnification of 16×.

The invention has been described in detail with particular reference to a preferred embodiment thereof, but it will be understood that variations and modifications can be effected within the spirit and scope of the invention.

What is claimed is:

1. A magnifier lens comprising, from a front, eye side to a rear object side:

(i) a front, positive power lens element having at least one aspheric surface;

(ii) a middle, negative power lens element accepting light from said front, positive power lens element, wherein said front, positive power lens element and said middle, negative power lens element in combination contain at least one diffractive surface; and (iii) a rear, meniscus lens element accepting light from said middle, negative power lens element, said rear, meniscus lens element having front and rear refractive surfaces, both of which are concave toward the object side, said rear refractive surface being (1) positionable within 5 mm of an associated object to be viewed from the eye side and (2) is an aspheric surface of negative power.

2. A magnifier lens according to claim 1 wherein said middle, negative power lens element is a meniscus lens element.

3. A magnifier lens according to claim 2 wherein said middle, negative power lens element is concave towards the eye side and is cemented to said front, positive power lens element.

4. A magnifier lens according to claim 1 wherein each of said front, positive power lens element and said middle, negative power lens element has a respective Abbe V-number and, the Abbe V-number of said front, positive power lens element is greater than the Abbe V-number of said middle, negative power lens element.

5. A magnifier lens according to claim 1 wherein said diffractive surface is on the object side facing surface of said middle, negative power lens element.

6. A magnifier lens according to claim 1 wherein said diffractive surface is on the eye side facing surface of said middle, negative power lens element.

* * * * *